(12) United States Patent
Klein et al.

(10) Patent No.: US 12,016,278 B2
(45) Date of Patent: Jun. 25, 2024

(54) IRRIGATION SYSTEM FOR VERTICAL GROW TOWER CROP PRODUCTION FACILITY

(71) Applicant: MJNN LLC, South San Francisco, CA (US)

(72) Inventors: Brice Leon Klein, San Francisco, CA (US); Allison Marie Maclellan, San Francisco, CA (US); Gage Goodspeed Coffin, Los Altos Hills, CA (US); Casey Bennet Call, San Francisco, CA (US); Loren Raymond Pilorin, Palo Alto, CA (US); Andrew Keith James, San Francisco, CA (US); Alexandre Le Roux, Redwood City, CA (US); Michael Peter Flynn, Palo Alto, CA (US); Alan Colbrie Schoen, Los Gatos, CA (US); Theodore Howe St. George, San Francisco, CA (US); Danielle Meredith Fallon, San Francisco, CA (US)

(73) Assignee: MJNN LLC, South San Francisco, CA (US)

(*) Notice: Subject to any disclaimer, the term of this patent is extended or adjusted under 35 U.S.C. 154(b) by 502 days.

(21) Appl. No.: 16/893,833

(22) Filed: Jun. 5, 2020

(65) Prior Publication Data

US 2020/0383287 A1   Dec. 10, 2020

Related U.S. Application Data

(60) Provisional application No. 62/903,795, filed on Sep. 21, 2019, provisional application No. 62/858,273, filed on Jun. 6, 2019.

(51) Int. Cl.
*A01G 31/06* (2006.01)
*A01G 31/00* (2018.01)

(52) U.S. Cl.
CPC ........ *A01G 31/06* (2013.01); *A01G 2031/006* (2013.01)

(58) Field of Classification Search
CPC .................. A01G 31/06; A01G 2031/006
See application file for complete search history.

(56) References Cited

U.S. PATENT DOCUMENTS 2,244,677 A    6/1941  Cornell
3,719,327 A *  3/1973  McMahan ............... F16K 25/02
                                                  239/542

(Continued)

FOREIGN PATENT DOCUMENTS

EP      0610137 B1    8/1994
EP      2374545 A2 * 10/2011  ............. A01G 25/00

*Primary Examiner* — Joshua D Huson
*Assistant Examiner* — Edgar Reyes
(74) *Attorney, Agent, or Firm* — Almanac IP Advisors LLP

(57) ABSTRACT

An irrigation system for a vertical farming structure having vertical grow towers and associated conveyance mechanisms for moving the vertical grow towers through a controlled environment, while being exposed to controlled conditions, such as lighting, airflow, humidity and nutritional support. The present disclosure describes a grow tower conveyance system that moves vertically-oriented grow towers to select positions along a grow line. An irrigation line having apertures at the select positions provides aqueous nutrient solution to the grow towers, while a gutter structure captures excess solution. In a closed loop system, the excess solution returns to a recirculation tank.

13 Claims, 22 Drawing Sheets

(56) References Cited

U.S. PATENT DOCUMENTS

| | | | |
|---|---|---|---|
| 10,136,587 B1* | 11/2018 | Johnson | A01G 9/023 |
| 2015/0196949 A1* | 7/2015 | Manuszak | B21F 33/025 |
| | | | 29/33 F |
| 2015/0223418 A1 | 8/2015 | Collins et al. | |
| 2015/0334930 A1* | 11/2015 | Stoltzfus | A01G 9/022 |
| | | | 47/62 A |
| 2017/0027119 A1* | 2/2017 | Storey | A01G 31/02 |
| 2017/0055460 A1 | 3/2017 | Brusatore | |
| 2017/0055473 A1* | 3/2017 | Baker | A01G 31/06 |
| 2018/0014485 A1 | 1/2018 | Witcher et al. | |
| 2018/0014486 A1* | 1/2018 | Creechley | A01G 9/249 |
| 2019/0269079 A1* | 9/2019 | Klein | F16B 7/0433 |
| 2019/0269080 A1* | 9/2019 | Whitworth | A01G 27/06 |
| 2019/0269083 A1* | 9/2019 | Klein | A01G 31/06 |
| 2020/0008378 A1* | 1/2020 | Van Buuren | A01G 9/029 |
| 2020/0367455 A1* | 11/2020 | Vesty | A01G 9/247 |

\* cited by examiner

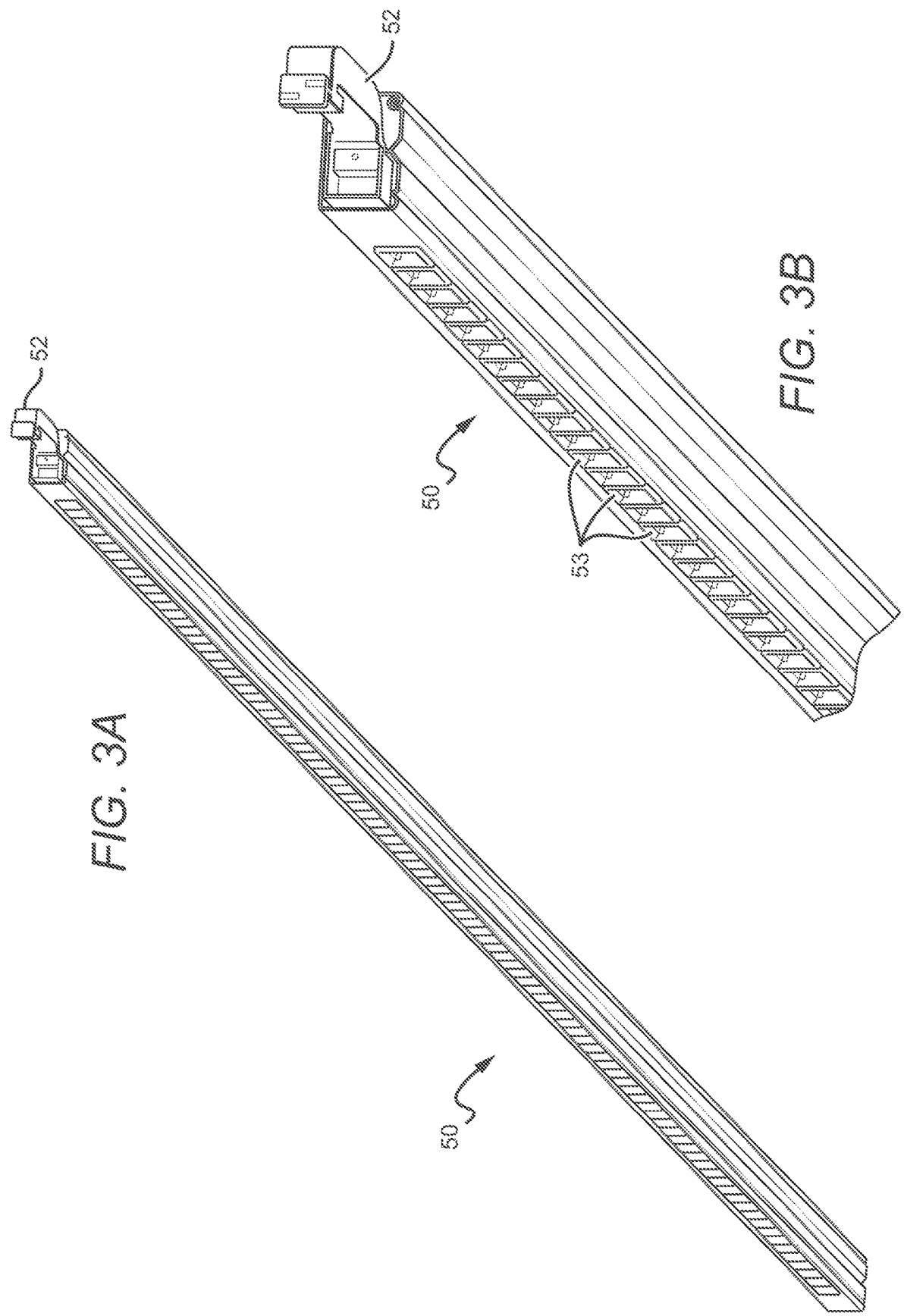

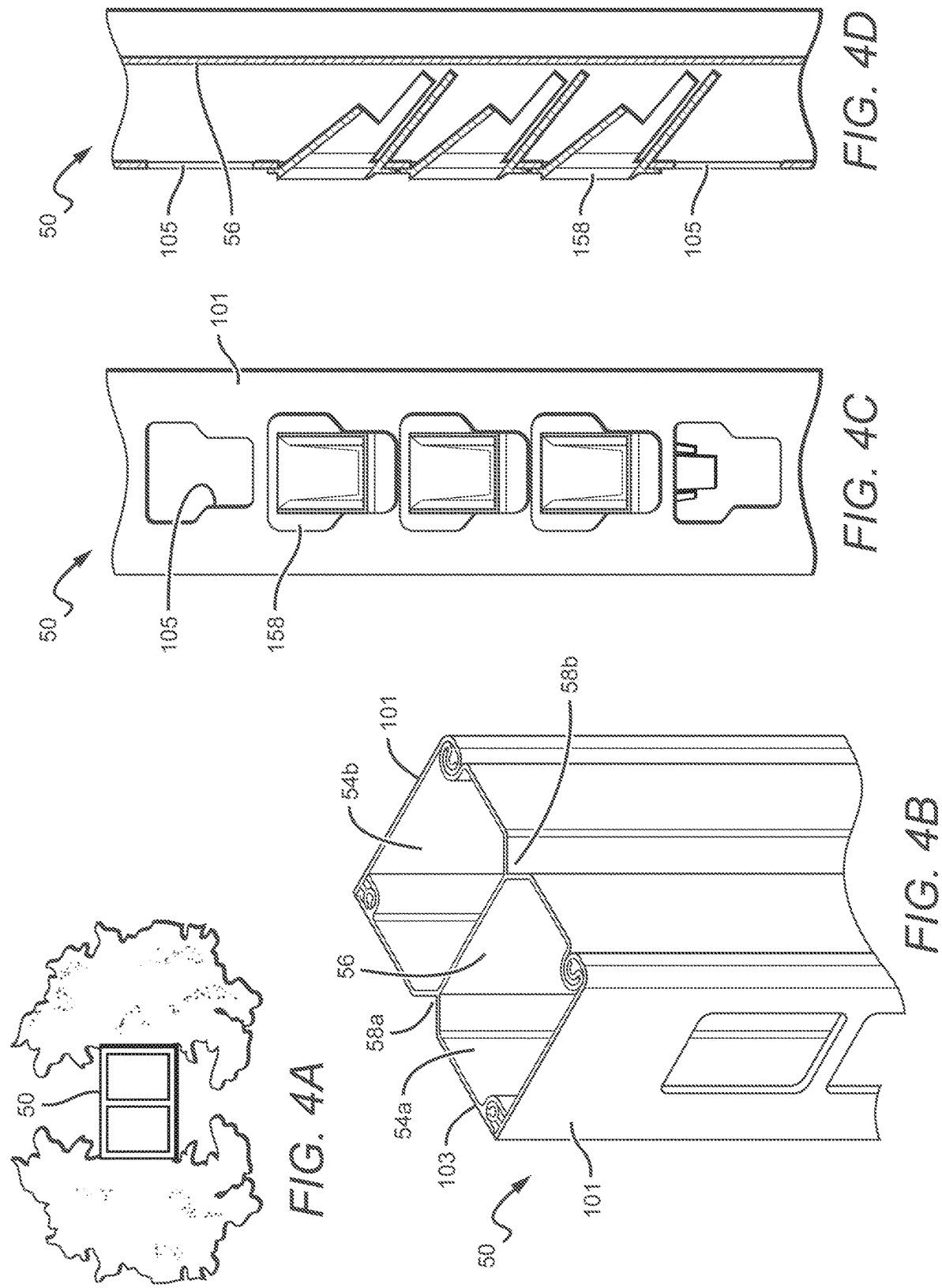

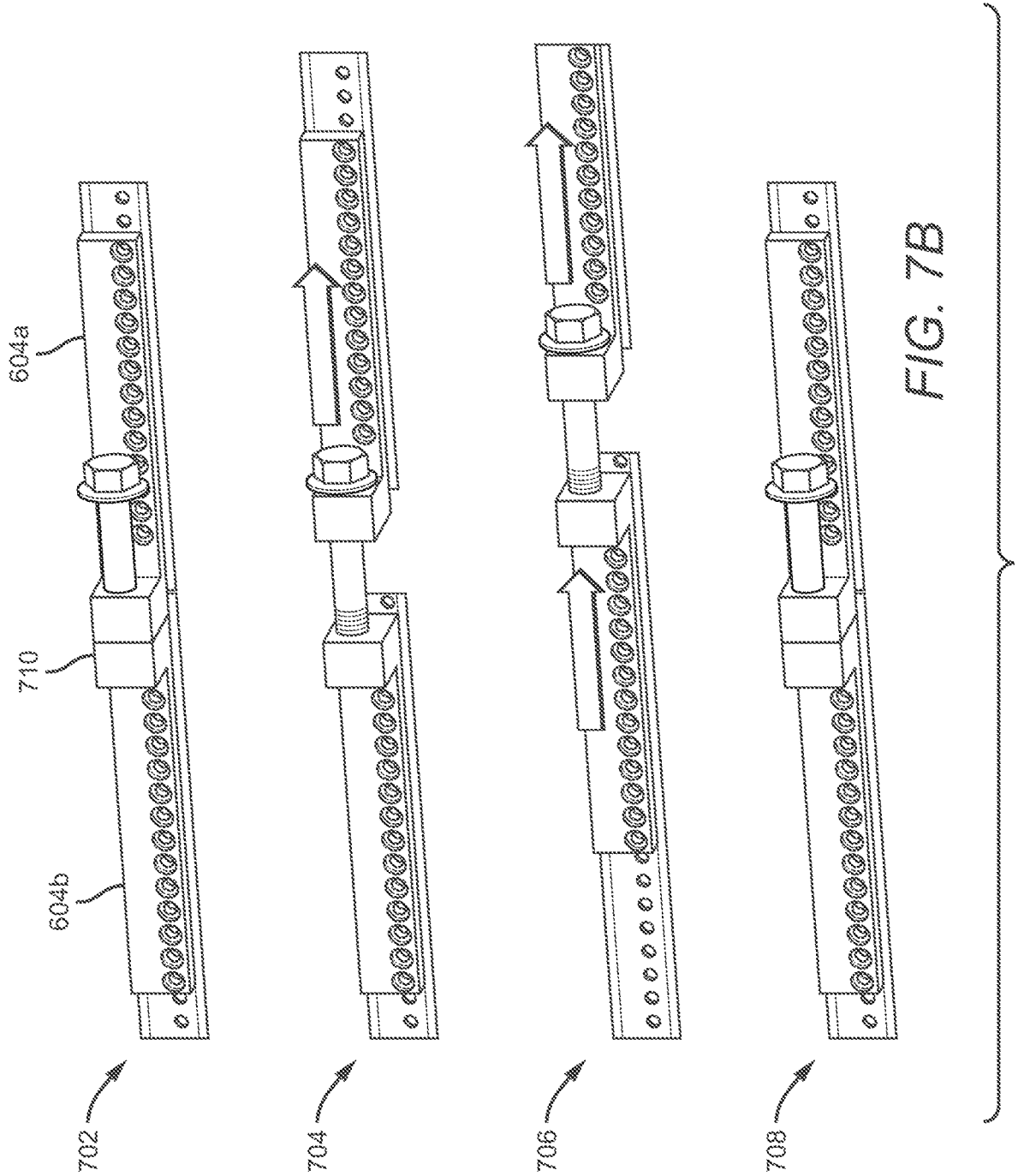

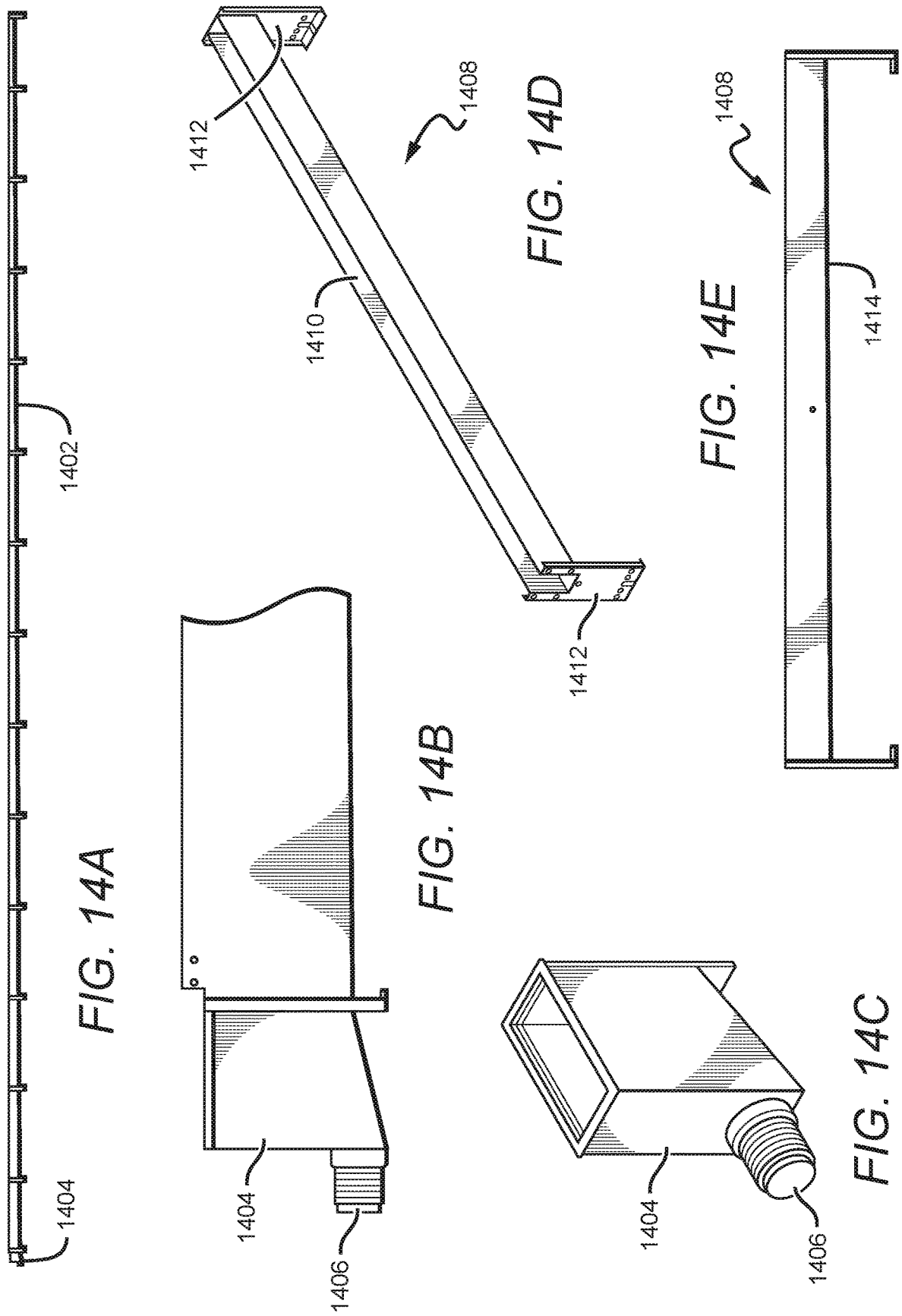

IRRIGATION SYSTEM FOR VERTICAL GROW TOWER CROP PRODUCTION FACILITY

CROSS-REFERENCE TO RELATED APPLICATION

The present application claims priority to U.S. provisional application Ser. Nos. 62/858,273 filed Jun. 6, 2019 and 62/903,795 filed Sep. 21, 2019, the disclosures of which are incorporated herein by reference for all purposes.

BACKGROUND

Field of the Disclosure

The disclosure relates generally to controlled environment agriculture and, more particularly, to irrigation and conveyance systems in vertical farming systems.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

During the twentieth century, agriculture slowly began to evolve from a conservative industry to a fast-moving high-tech industry. Global food shortages, climate change and societal changes drove a move away from manually-implemented agriculture techniques toward computer-implemented technologies. In the past, and in many cases still today, farmers only had one growing season to produce the crops that would determine their revenue and food production for the entire year. However, this is changing. With indoor growing as an option and with better access to data processing technologies, the science of agriculture has become more agile. It is adapting and learning as new data is collected and insights are generated.

Advancements in technology are making it feasible to control the effects of nature with the advent of "controlled environment agriculture." Improved efficiencies in space utilization, lighting, and a better understanding of hydroponics, aeroponics, crop cycles, and advancements in environmental control systems have allowed humans to better recreate environments conducive for agriculture crop growth with the goals of greater yield per square foot, better nutrition and lower cost.

US Patent Publication Nos. 2018/0014485 and 2018/0014486, both assigned to the assignee of the present disclosure and incorporated by reference in their entirety herein, describe environmentally controlled vertical farming systems. The vertical farming structure (e.g., a vertical column) may be moved about an automated conveyance system in an open or closed-loop fashion, exposed to precision-controlled lighting, airflow and humidity, with ideal nutritional support.

US Patent Pub. No. US 2017/0055460 ("Brusatore") describes a system for continuous automated growing of plants. A vertical array of plant supporting arms extends radially from a central axis. Each arm includes pot receptacles which receive the plant seedling, and liquid nutrients and water. The potting arms are rotated beneath grow lamps and pollinating arms. However, the spacing between plants appears to be fixed.

SUMMARY OF THE DISCLOSURE

The present disclosure is directed to systems that facilitating loading of vertical grow towers in a vertical farming structure having associated conveyance mechanisms for moving the vertical grow towers through a controlled environment, while being exposed to controlled conditions, such as lighting, airflow, humidity and nutritional support. The present disclosure describes a load conveyance mechanism that transfers grow towers to a loading position where grow towers are loaded onto a select grow line. Each grow line may include a grow tower conveyance system that moves vertically-oriented grow towers to select positions along a grow line. The system may include a tower catch mechanism that registers grow towers in position at the loading position for insertion into a select grow line. In some implementations, the tower catch mechanism can be integrated into other structures of the vertical farming system, such as a gutter basin corresponding to a select grow line.

BRIEF DESCRIPTION OF THE DRAWINGS

FIGS. 3A and 3B are perspective views of an example grow tower.

FIG. 4A is a top view of an example grow tower; FIG. 4B is a perspective, top view of an example grow tower; FIG. 4C is an elevation view of a section of an example grow tower; and FIG. 4D is a sectional, elevation view of a portion of an example grow tower.

FIG. 7B illustrates an alternative cam channel including an expansion joint.

FIG. 14A illustrates an example gutter according to an implementation of the invention;

FIG. 14B is a side elevation view of a collector end structure of the gutter; FIG. 14C is a perspective view of the collector end structure; FIG. 14D is a perspective view of a gutter section; and FIG. 14E is a side elevation view of the gutter section.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein.

Figure 1:
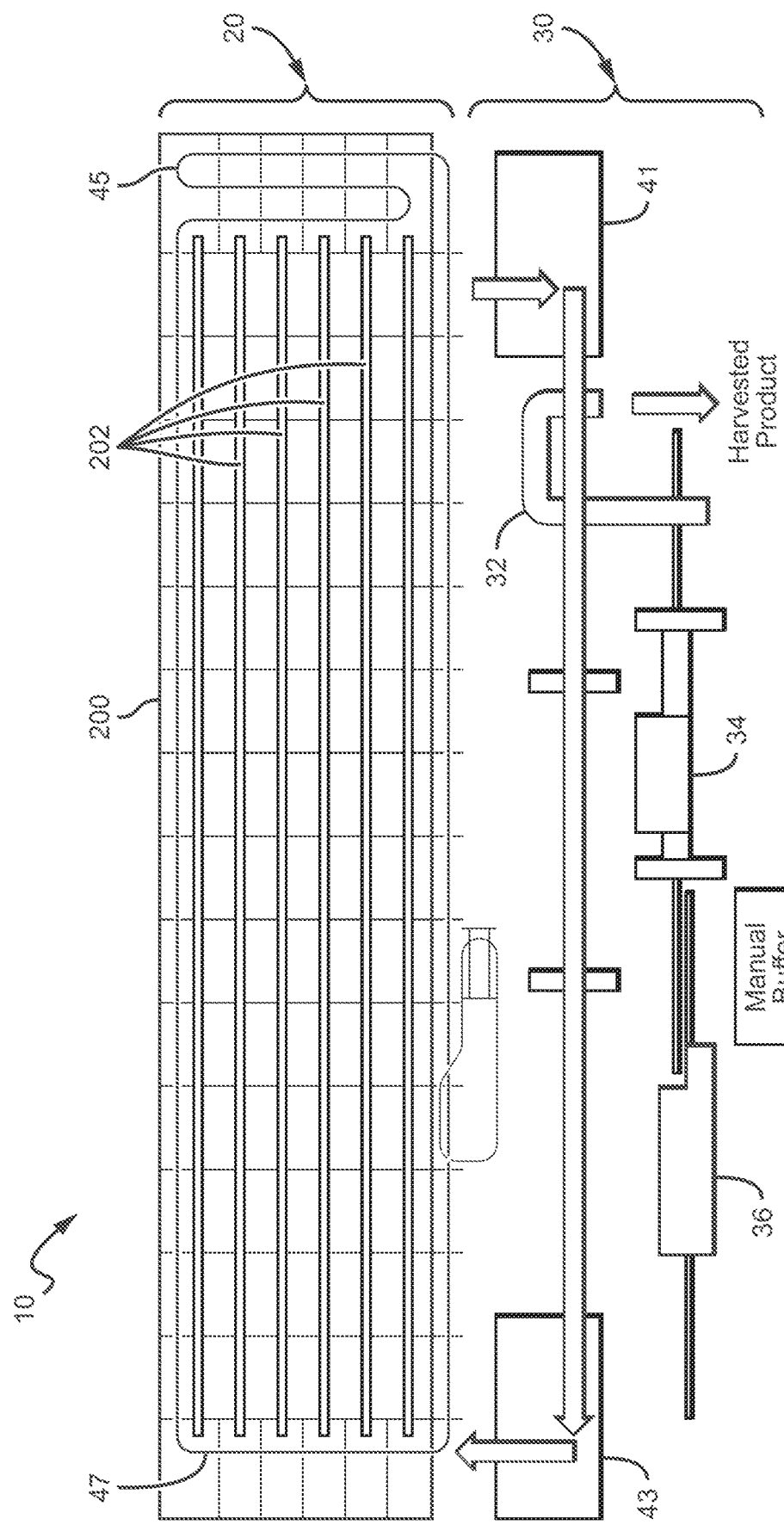
FIG. 1 is a functional block diagram illustrating an example controlled environment agriculture system.
Figure 2:
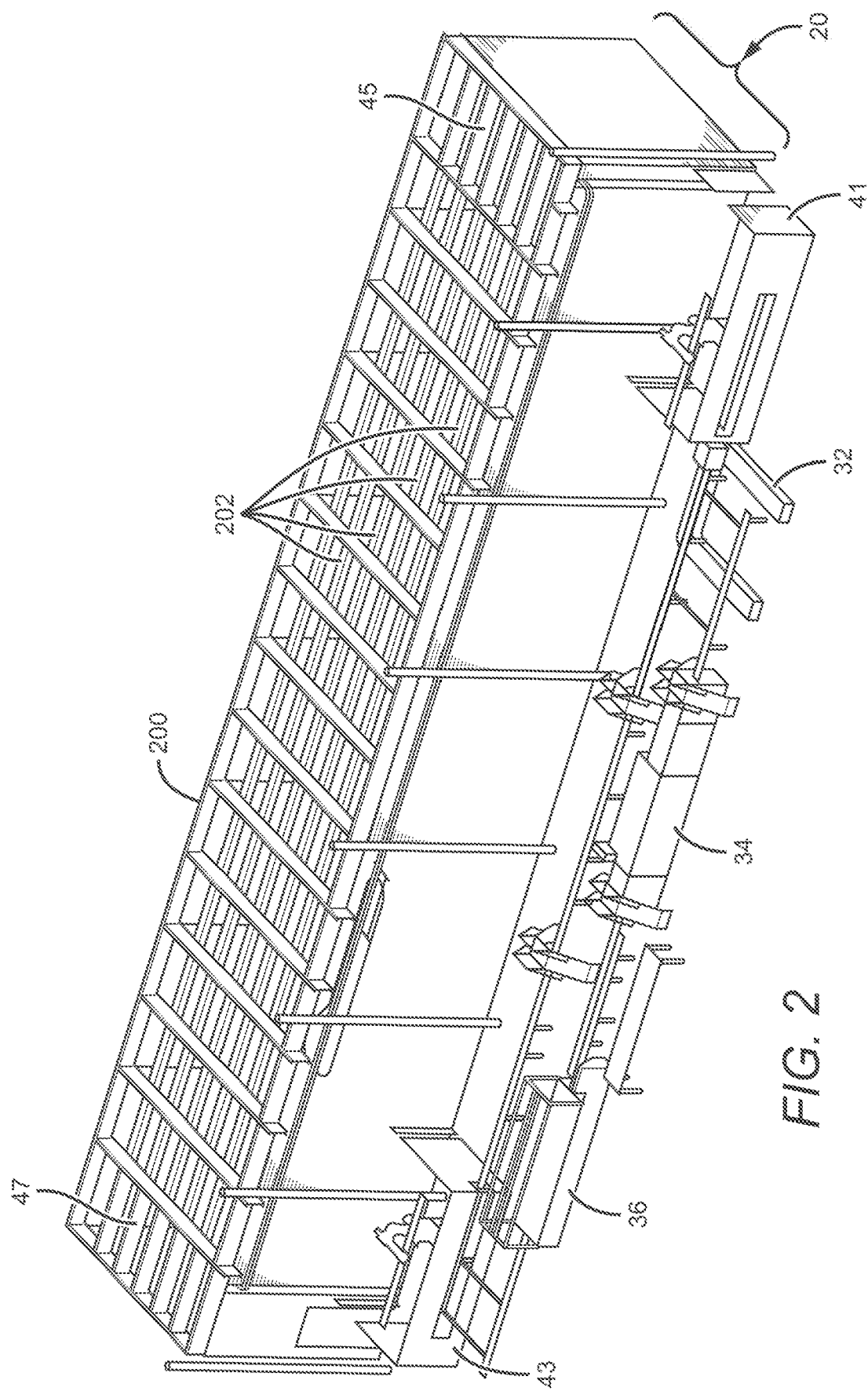
FIG. 2 is a perspective view of an example controlled environment agriculture system.

The following describes a vertical farm production system configured for high density growth and crop yield. FIGS. 1 and 2 illustrate a controlled environment agriculture system 10 according to one possible embodiment of the invention. At a high level, the system 10 may include an environmentally-controlled growing chamber 20, a vertical tower conveyance system 200 disposed within the growing chamber 20 and configured to convey grow towers 50 with crops disposed therein, and a central processing facility 30. The crops or plants species that may be grown may be gravitropic/geotropic and/or phototropic, or some combination thereof. The crops or plant species may vary considerably and include various leaf vegetables, fruiting vegetables, flowering crops, fruits and the like. The controlled environment agriculture system 10 may be configured to grow a single crop type at a time or to grow multiple crop types concurrently.

The system 10 may also include conveyance systems for moving the grow towers in a circuit throughout the crop's growth cycle. The circuit may comprise a staging area configured for loading the grow towers into and out of the vertical tower conveyance mechanism 200. The central processing system 30 may include one or more conveyance mechanisms for directing grow towers to stations in the central processing system 30—e.g., stations for loading plant plugs into, and harvesting crops from, the grow towers. The vertical tower conveyance system 200, within the growing chamber 20, is configured to support and translate one or more grow towers 50 along grow lines 202. Each grow tower 50 is configured for containing plant growth media that supports a root structure of at least one crop plant growing therein. Each grow tower 50 is also configured to releasably attach to a grow line 202 in a vertical orientation and move along the grow line 202 during a growth phase. Together, the vertical tower conveyance mechanism 200 and the central processing system 30 (including associated conveyance mechanisms) can be arranged in a production circuit under control of one or more computing and/or control systems.

The growth environment 20 may include light emitting sources positioned at various locations between and along the grow lines 202 of the vertical tower conveyance system 200. The light emitting sources can be positioned laterally relative to the grow towers 50 in the grow line 202 and configured to emit light toward the lateral faces of the grow towers 50 that include openings from which crops grow. The light emitting sources may be incorporated into a water-cooled, LED lighting system as described in U.S. Publ. No. 2017/0146226A1, the disclosure of which is incorporated by reference herein. In such an embodiment, the LED lights may be arranged in a bar-like structure. The bar-like structure may be placed in a vertical orientation to emit light laterally to substantially the entire length of adjacent grow towers 50. Multiple light bar structures may be arranged in the growth environment 20 along and between the grow lines 202. Other lighting systems and configurations may be employed. For example, the light bars may be arranged horizontally between grow lines 202.

The growth environment 20 may also include a nutrient supply system configured to supply an aqueous crop nutrient solution to the crops as they translate through the growth chamber 20. As discussed in more detail below, the nutrient supply system may apply aqueous crop nutrient solution to the top of the grow towers 50. Gravity may cause the solution to travel down the vertically-oriented grow tower 50 and through the length thereof to supply solution to the crops disposed along the length of the grow tower 50. The growth environment 20 may also include an airflow source configured to, when a tower is mounted to a grow line 202, direct airflow in the lateral growth direction of growth and through an under-canopy of the growing plant, so as to disturb the boundary layer of the under-canopy of the growing plant. In other implementations, airflow may come from the top of the canopy or orthogonal to the direction of plant growth. The growth environment 20 may also include a control system, and associated sensors, for regulating at least one growing condition, such as air temperature, airflow speed, relative air humidity, and ambient carbon dioxide gas content. The control system may for example include such sub-systems as HVAC units, chillers, fans and associated ducting and air handling equipment. Grow towers 50 may have identifying attributes (such as bar codes or RFID tags). The controlled environment agriculture system 10 may include corresponding sensors and programming logic for tracking the grow towers 50 during various stages of the farm production cycle and/or for controlling one or more conditions of the growth environment. The operation of control system and the length of time towers remain in growth environment can vary considerably depending on a variety of factors, such as crop type and the like.

As discussed above, grow towers 50 with newly transplanted crops or seedlings are transferred from the central processing system 30 into the vertical tower conveyance system 200. Vertical tower conveyance system 200 moves the grow towers 50 to predefined positions along respective grow lines 202 in growth environment 20 in a controlled fashion, as discussed in more detail below. Crops disposed in grow towers 50 are exposed to the controlled conditions of growth environment (e.g., light, temperature, humidity, air flow, aqueous nutrient supply, etc.). The control system is capable of automated adjustments to optimize growing conditions within the growth chamber 20 to make continuous improvements to various attributes, such as crop yields, visual appeal and nutrient content. In addition, US Patent Publication Nos. 2018/0014485 and 2018/0014486 describe application of machine learning and other operations to optimize grow conditions in a vertical farming system. In some implementations, environmental condition sensors may be disposed on grow towers 50 or at various locations in growth environment 20. When crops are ready for harvesting, grow towers 50 with crops to be harvested are transferred from the vertical tower conveyance system 200 to the central processing system 30 for harvesting and other processing operations.

Central processing system 30, as discussed in more detail below, may include processing stations directed to injecting seedlings into towers 50, harvesting crops from towers 50, and cleaning towers 50 that have been harvested. Central processing system 30 may also include conveyance mechanisms that move towers 50 between such processing stations. For example, as FIG. 1 illustrates, central processing system 30 may include harvester station 32, washing station 34, and transplanter station 36. Harvester station 32 may deposit harvested crops into food-safe containers and may include a conveyance mechanism for conveying the containers to post-harvesting facilities (e.g., preparation, washing, packaging and storage) that are beyond the scope of this disclosure.

Controlled environment agriculture system 10 may also include one or more conveyance mechanisms for transferring grow towers 50 between growth environment 20 and central processing system 30. In the implementation shown, the stations of central processing system 30 operate on grow towers 50 in a horizontal orientation. In one implementation, an automated pickup station 43, and associated control logic, may be operative to releasably grasp a horizontal tower from a loading location, rotate the tower to a vertical orientation and attach the tower to a transfer station for insertion into a selected grow line 202 of the growth environment 20. On the other end of growth environment 20, automated laydown station 41, and associated control logic, may be operative to releasably grasp and move a vertically-oriented grow tower 50 from a buffer location, rotate the grow tower 50 to a horizontal orientation and place it on a conveyance system for loading into harvester station 32. In some implementations, if a grow tower 50 is rejected due to quality control concerns, the conveyance system may bypass the harvester station 32 and carry the grow tower to washing station 34 (or some other station). The automated laydown and pickup stations 41 and 43 may each comprise a six-degrees of freedom robotic arm, such as a FANUC robot. The stations 41 and 43 may also include end effectors for releasably grasping grow towers 50 at opposing ends.

Figure 12:
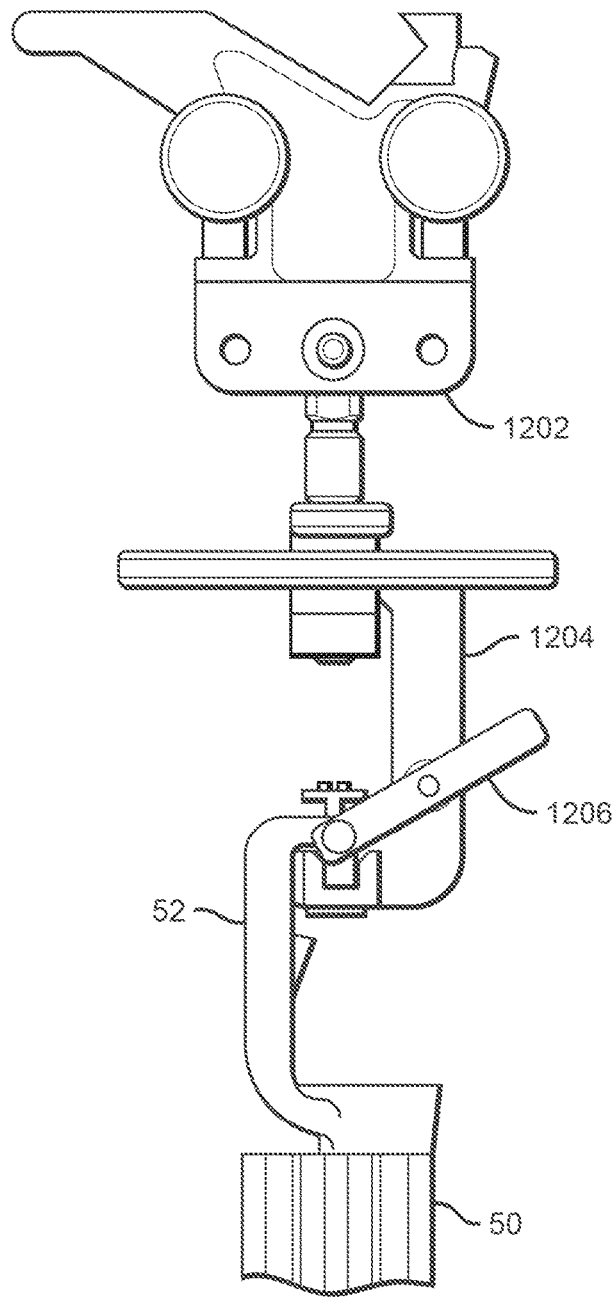
FIG. 12 is an elevation view of an example carriage assembly.

Growth environment 20 may also include automated loading and unloading mechanisms for inserting grow towers 50 into selected grow lines 202 and unloading grow towers 50 from the grow lines 202. In one implementation, the load transfer conveyance mechanism 47 may include a powered and free conveyor system that conveys carriages each loaded with a grow tower 50 from the automated pickup station 43 to a selected grow line 202. Vertical grow tower conveyance system 200 may include sensors (such as RFID or bar code sensors) to identify a given grow tower 50 and, under control logic, select a grow line 202 for the grow tower 50. Particular algorithms for grow line selection can vary considerably depending on a number of factors and is beyond the scope of this disclosure. The load transfer conveyance mechanism 47 may also include one or more linear actuators that pushes the grow tower 50 onto a grow line 202. Similarly, the unload transfer conveyance mechanism 45 may include one or more linear actuators that push or pull grow towers from a grow line 202 onto a carriage of another powered and free conveyor mechanism, which conveys the carriages 1202 from the grow line 202 to the automated laydown station 41. FIG. 12 illustrates a carriage 1202 that may be used in a powered and free conveyor mechanism. In the implementation shown, carriage 1202 includes hook 1204 that engages hook 52 attached to a grow tower 50. A latch assembly 1206 may secure the grow tower 50 while it is being conveyed to and from various locations in the system. In one implementation, one or both of load transfer conveyance mechanism 47 and unload transfer conveyance mechanism 45 may be configured with a sufficient track distance to establish a zone where grow towers 50 may be buffered. For example, unload transfer conveyance mechanism 45 may be controlled such that it unloads a set of towers 50 to be harvested unto carriages 1202 that are moved to a buffer region of the track. On the other end, automated pickup station 43 may load a set of towers to be inserted into growth environment 20 onto carriages 1202 disposed in a buffer region of the track associated with load transfer conveyance mechanism 47.

Grow Towers

Grow towers 50 provide the sites for individual crops to grow in the system. As FIGS. 3A and 3B illustrate, a hook 52 attaches to the top of grow tower 50. Hook 52 allows grow tower 50 to be supported by a grow line 202 when it is inserted into the vertical tower conveyance system 200. In one implementation, a grow tower 50 measures 5.172 meters long, where the extruded length of the tower is 5.0 meters, and the hook is 0.172 meters long. The extruded rectangular profile of the grow tower 50, in one implementation, measures 57 mm×93 mm (2.25"×3.67"). The hook 52 can be designed such that its exterior overall dimensions are not greater than the extruded profile of the grow tower 50. The foregoing dimensions are for didactic purposes. The dimensions of grow tower 50 can be varied depending on a number of factors, such as desired throughput, overall size of the system, and the like. For example, the grow tower 50 may be up to 10 meters long or greater, for example.

Grow towers 50 may include a set of grow sites 53 arrayed along at least one face of the grow tower 50. In the implementation shown in FIG. 4A, grow towers 50 include grow sites 53 on opposing faces such that plants protrude from opposing sides of the grow tower 50. Transplanter station 36 may transplant seedlings into empty grow sites 53 of grow towers 50, where they remain in place until they are fully mature and ready to be harvested. In one implementation, the orientation of the grow sites 53 are perpendicular to the direction of travel of the grow towers 50 along grow line 202. In other words, when a grow tower 50 is inserted into a grow line 202, plants extend from opposing faces of the grow tower 50, where the opposing faces are parallel to the direction of travel. Although a dual-sided configuration is preferred, the invention may also be utilized in a single-sided configuration where plants grow along a single face of a grow tower 50.

U.S. application Ser. No. 15/968,425 filed on May 1, 2018, which is incorporated by reference herein for all purposes, discloses an example tower structure configuration that can be used in connection with various embodiments of the invention. In the implementation shown, grow towers 50 may each consist of three extrusions which snap together to form one structure. As shown, the grow tower 50 may be a dual-sided hydroponic tower, where the tower body 103 includes a central wall 56 that defines a first tower cavity 54a and a second tower cavity 54b. FIG. 4B provides a perspective view of an exemplary dual-sided, multi-piece hydroponic grow tower 50 in which each front face plate 101 is hingeably coupled to the tower body 103. In FIG. 4B, each front face plate 101 is in the closed position. The cross-section of the tower cavities 54a, 54b may be in the range of 1.5 inches by 1.5 inches to 3 inches by 3 inches, where the term "tower cavity" refers to the region within the body of the tower and behind the tower face plate. The wall thickness of the grow towers 50 maybe within the range of 0.065 to 0.075 inches. A dual-sided hydroponic tower, such as that shown in FIGS. 4A and 4B, has two back-to-back cavities 54a and 54b, each preferably within the noted size range. In the configuration shown, the grow tower 50 may include (i) a first V-shaped groove 58a running along the length of a first side of the tower body 103, where the first V-shaped groove is centered between the first tower cavity and the second tower cavity; and (ii) a second V-shaped groove 58b running along the length of a second side of the tower body 103, where the second V-shaped groove is centered between the first tower cavity and the second tower cavity. The V-shaped grooves 58a, 58b may facilitate registration, alignment and/or feeding of the towers 50 by one or more of the stations in central processing system 30. U.S. application Ser. No. 15/968,425 discloses additional details regarding the construction and use of towers that may be used in embodiments of the invention. Another attribute of V-shaped grooves 58a, 58b is that they effectively narrow the central wall 56 to promote the flow of aqueous nutrient solution centrally where the plant's roots are located. Other implementations are possible. For example, a grow tower 50 may be formed as a unitary, single extrusion, where the material at the side walls flex to provide a hinge and allow the cavities to be opened for cleaning. U.S. application Ser. No. 16/577,322 filed on Sep. 20, 2019, which is incorporated by reference herein for all purposes, discloses an example grow tower 50 formed by a single extrusion.

As FIGS. 4C and 4D illustrate, grow towers 50 may each include a plurality of cut-outs 105 for use with a compatible plug holder 158, such as the plug holder disclosed in any one of co-assigned and co-pending U.S. patent application Ser. Nos. 15/910,308, 15/910,445 and 15/910,796, each filed on 2 Mar. 2018, the disclosures of which is incorporated herein for any and all purposes. As shown, the plug holders 158 may be oriented at a 45-degree angle relative to the front face plate 101 and the vertical axis of the grow tower 50. It should be understood, however, that tower design disclosed in the present application is not limited to use with this particular plug holder or orientation, rather, the towers disclosed herein may be used with any suitably sized and/or oriented plug holder. As such, cut-outs 105 are only meant to illustrate, not limit, the present tower design and it should be understood that the present invention is equally applicable to towers with other cut-out designs. Plug Holder 158 may be ultrasonically welded, bonded, or otherwise attached to tower face 101.

The use of a hinged front face plate simplifies manufacturing of grow towers, as well as tower maintenance in general and tower cleaning in particular. For example, to clean a grow tower 50 the face plates 101 are opened from the body 103 to allow easy access to the body cavity 54a or 54b. After cleaning, the face plates 101 are closed. Since the face plates remain attached to the tower body 103 throughout the cleaning process, it is easier to maintain part alignment and to insure that each face plate is properly associated with the appropriate tower body and, assuming a double-sided tower body, that each face plate 101 is properly associated with the appropriate side of a specific tower body 103. Additionally, if the planting and/or harvesting operations are performed with the face plate 101 in the open position, for the dual-sided configuration both face plates can be opened and simultaneously planted and/or harvested, thus eliminating the step of planting and/or harvesting one side and then rotating the tower and planting and/or harvesting the other side. In other embodiments, planting and/or harvesting operations are performed with the face plate 101 in the closed position.

Other implementations are possible. For example, grow tower 50 can comprise any tower body that includes a volume of medium or wicking medium extending into the tower interior from the face of the tower (either a portion or individual portions of the tower or the entirety of the tower length. For example, U.S. Pat. No. 8,327,582, which is incorporated by reference herein, discloses a grow tube having a slot extending from a face of the tube and a grow medium contained in the tube. The tube illustrated therein may be modified to include a hook 52 at the top thereof and to have slots on opposing faces, or one slot on a single face.

Vertical Tower Conveyance System

Figure 5A:
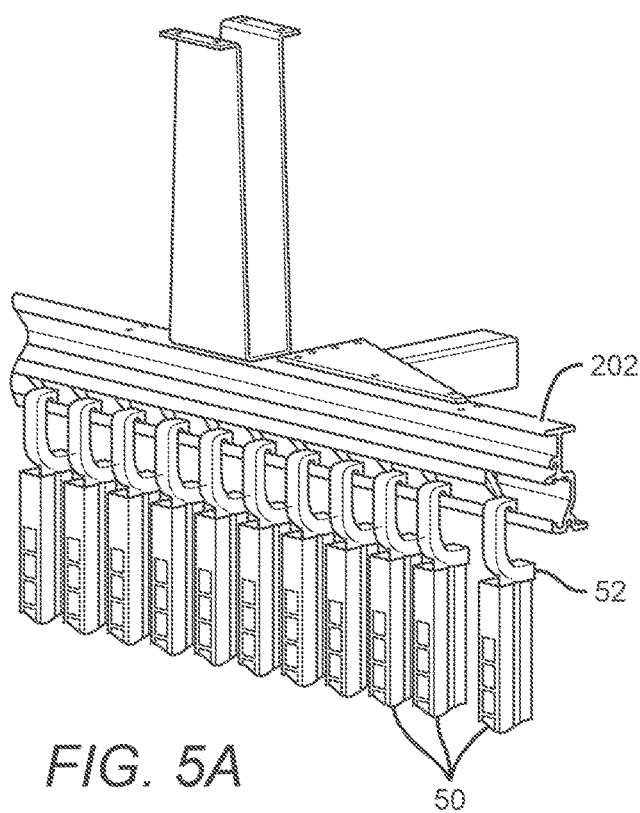
FIG. 5A is a perspective view of a portion of an example grow line.
Figure 5B:
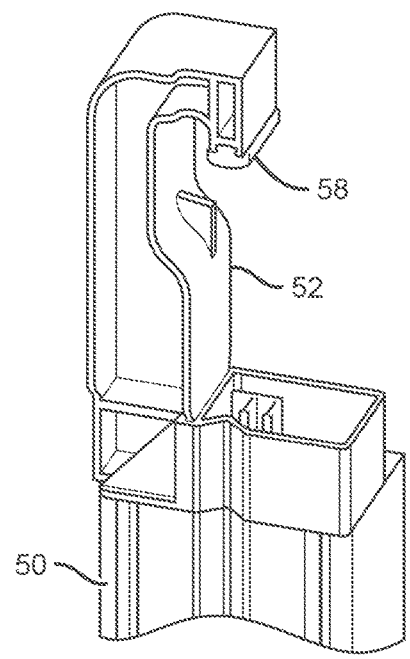
FIG. 5B is a perspective view of an example tower hook.

FIG. 5A illustrates a portion of a grow line 202 in vertical tower conveyance system 200. In one implementation, the vertical tower conveyance system 200 includes a plurality of grow lines 202 arranged in parallel. As discussed above, automated loading and unloading mechanisms 45, 47 may selectively load and unload grow towers 50 from a grow line 202 under automated control systems. As FIG. 5A shows, each grow line 202 supports a plurality of grow towers 50. In one implementation, a grow line 202 may be mounted to the ceiling (or other support) of the grow structure by a bracket for support purposes. Hook 52 hooks into, and attaches, a grow tower 50 to a grow line 202, thereby supporting the tower in a vertical orientation as it is translated through the vertical tower conveyance system 200. A conveyance mechanism moves towers 50 attached to respective grow lines 202.

Figure 8:
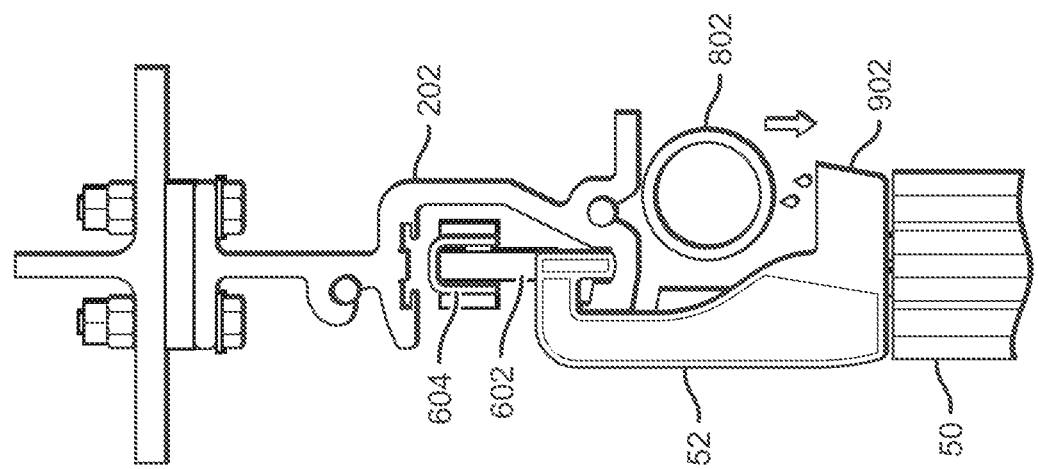
FIG. 8 is a profile view of an example grow line and irrigation supply line.
Figure 10:
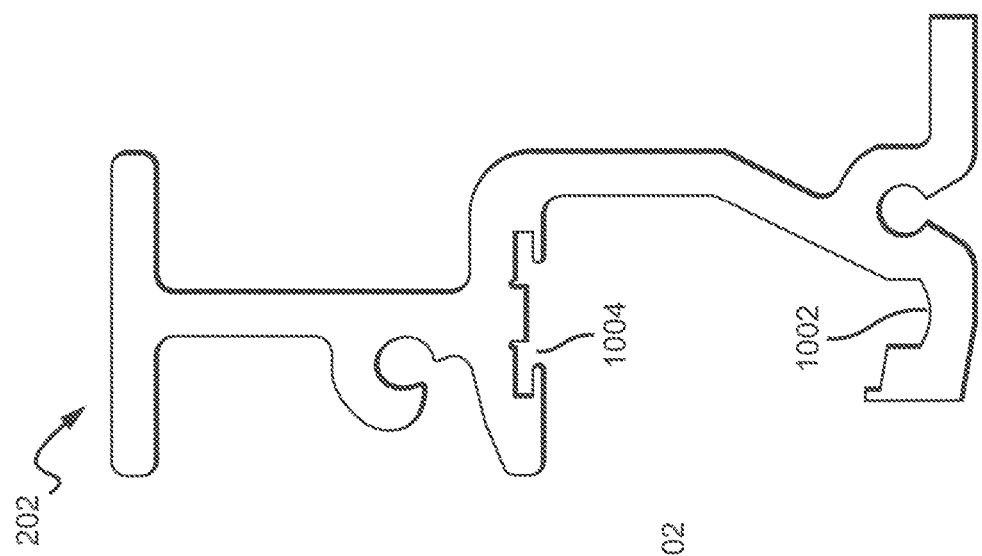
FIG. 10 is a profile view of an example grow line.
Figure 9:
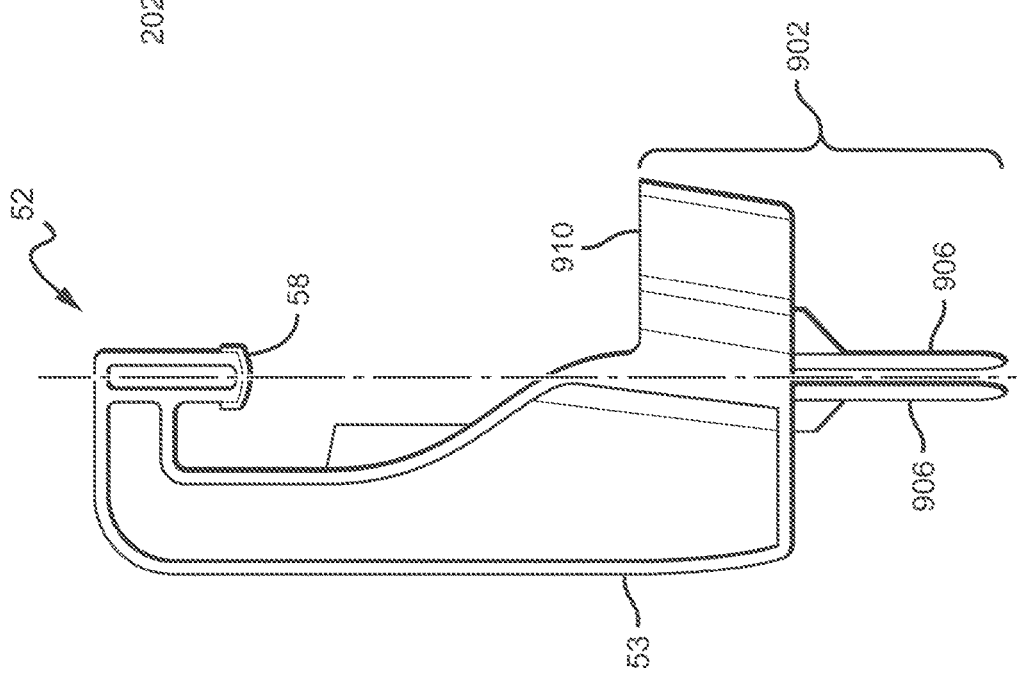
FIG. 9 is a side view of an example tower hook and integrated funnel structure.

FIG. 10 illustrates the cross section or extrusion profile of a grow line 202, according to one possible implementation of the invention. The grow line 202 may be an aluminum extrusion. The bottom section of the extrusion profile of the grow line 202 includes an upward facing groove 1002. As FIG. 9 shows, hook 52 of a grow tower 50 includes a main body 53 and corresponding member 58 that engages groove 1002 as shown in FIGS. 5A and 8. These hooks allow the grow towers 50 to hook into the groove 1002 and index along the grow line 202 as discussed below. Conversely, grow towers 50 can be manually unhooked from a grow line 202 and removed from production. This ability may be necessary if a crop in a grow tower 50 becomes diseased so that it does not infect other towers. In one possible implementation, the width of groove 1002 (for example, 13 mm) is an optimization between two different factors. First, the narrower the groove the more favorable the binding rate and the less likely grow tower hooks 52 are to bind. Conversely, the wider the groove the slower the grow tower hooks wear due to having a greater contact patch. Similarly, the depth of the groove, for example 10 mm, may be an optimization between space savings and accidental fallout of tower hooks.

Hooks 52 may be injection-molded plastic parts. In one implementation, the plastic may be polyvinyl chloride (PVC), acrylonitrile butadiene styrene (ABS), or an Acetyl Homopolymer (e.g., Delrin® sold by DuPont Company). The hook 52 may be solvent bonded to the top of the grow tower 50 and/or attached using rivets or other mechanical fasteners. The groove-engaging member 58 which rides in the rectangular groove 1002 of the grow line 202 may be a separate part or integrally formed with hook 52. If separate, this part can be made from a different material with lower friction and better wear properties than the rest of the hook, such as ultra-high-molecular weight polyethylene or acetal. To keep assembly costs low, this separate part may snap onto the main body of the hook 52. Alternatively, the separate part also be over-molded onto the main body of hook 52.

Figure 6:
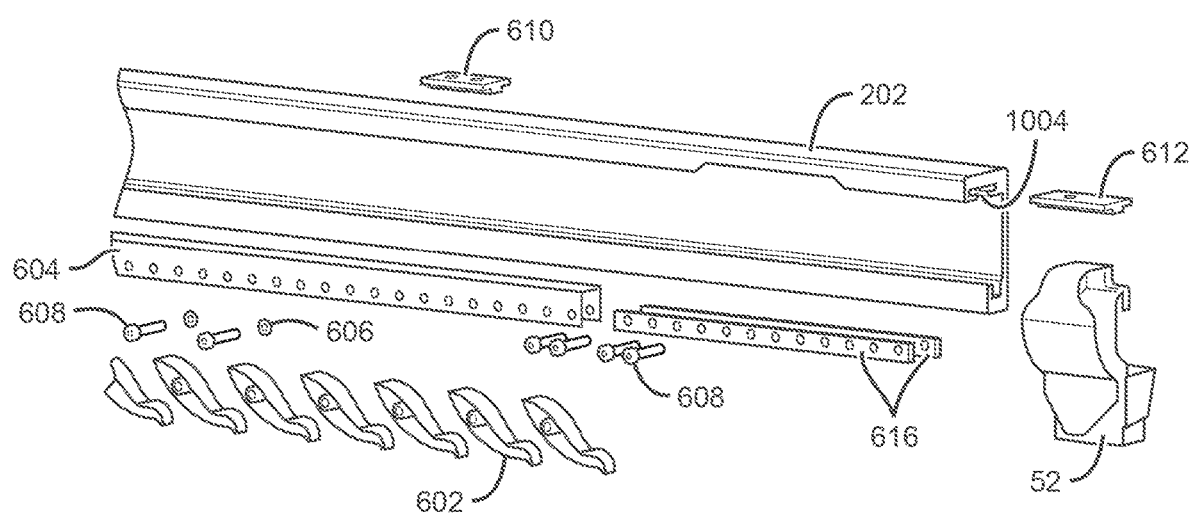
FIG. 6 is an exploded, perspective view of a portion of an example grow line and reciprocating cam mechanism.

As FIGS. 6 and 10 illustrate, the top section of the extrusion profile of grow line 202 contains a downward facing t-slot 1004. Linear guide carriages 610 (described below) ride within the t-slot 1004. The center portion of the t-slot 1004 may be recessed to provide clearance from screws or over-molded inserts which may protrude from the carriages 610. Each grow line 202 can be assembled from a number of separately fabricated sections. In one implementation, sections of grow line 202 are currently modeled in 5 to 6-meter lengths. Longer sections reduce the number of junctions but are more susceptible to thermal expansion issues and may significantly increase shipping costs. Additional features not captured by the Figures include intermittent mounting holes to attach the grow line 202 to the ceiling structure and to attach irrigation lines. Interruptions to the t-slot 1004 may also be machined into the conveyor body. These interruptions allow the linear guide carriages 610 to be removed without having to slide them all the way out the end of a grow line 202.

At the junction between two sections of a grow line 202, a block 612 may be located in the t-slots 1004 of both conveyor bodies. This block serves to align the two grow line sections so that grow towers 50 may slide smoothly between them. Alternative methods for aligning sections of a grow line 202 include the use of dowel pins that fit into dowel holes in the extrusion profile of the section. The block 612 may be clamped to one of the grow line sections via a set screw, so that the grow line sections can still come together and move apart as the result of thermal expansion. Based on the relatively tight tolerances and small amount of material required, these blocks may be machined. Bronze may be used as the material for such blocks due to its strength, corrosion resistance, and wear properties.

In one implementation, the vertical tower conveyance system 200 utilizes a reciprocating linear ratchet and pawl structure (hereinafter referred to as a "reciprocating cam structure or mechanism") to move grow towers 50 along a grow line 202. FIGS. 5A, 6 and 7 illustrate one possible reciprocating cam mechanism that can be used to move grow towers 50 across grow lines 202. Pawls or "cams" 602 physically push grow towers 50 along grow line 202. Cams 602 are attached to cam channel 604 (see below) and rotate about one axis. On the forward stroke, the rotation is limited by the top of the cam channel 604, causing the cams 602 to push grow towers 50 forward. On the reserve or back stroke, the rotation is unconstrained, thereby allowing the cams to ratchet over the top of the grow towers 50. In this way, the cam mechanism can stroke a relatively short distance back and forth, yet grow towers 50 always progress forward along the entire length of a grow line 202. A control system, in one implementation, controls the operation of the reciprocating cam mechanism of each grow line 202 to move the grow towers 50 according to a programmed growing sequence. In between movement cycles, the actuator and reciprocating cam mechanism remain idle.

The pivot point of the cams 602 and the means of attachment to the cam channel 604 consists of a binding post 606 and a hex head bolt 608; alternatively, detent clevis pins may be used. The hex head bolt 608 is positioned on the inner side of the cam channel 604 where there is no tool access in the axial direction. Being a hex head, it can be accessed radially with a wrench for removal. Given the large number of cams needed for a full-scale farm, a high-volume manufacturing process such as injection molding is suitable. ABS is suitable material given its stiffness and relatively low cost. All the cams 602 for a corresponding grow line 202 are attached to the cam channel 604. When connected to an actuator, this common beam structure allows all cams 602 to stroke back and forth in unison. The structure of the cam channel 604, in one implementation, is a downward facing u-channel constructed from sheet metal. Holes in the downward facing walls of cam channel 604 provide mounting points for cams 602 using binding posts 606.

Holes of the cam channel 604, in one implementation, are spaced at 12.7 mm intervals. Therefore, cams 602 can be spaced relative to one another at any integer multiple of 12.7 mm, allowing for variable grow tower spacing with only one cam channel. The base of the cam channel 604 limits rotation of the cams during the forward stroke. All degrees of freedom of the cam channel 604, except for translation in the axial direction, are constrained by linear guide carriages 610 (described below) which mount to the base of the cam channel 604 and ride in the t-slot 1004 of the grow line 202. Cam channel 604 may be assembled from separately formed sections, such as sections in 6-meter lengths. Longer sections reduce the number of junctions but may significantly increase shipping costs. Thermal expansion is generally not a concern because the cam channel is only fixed at the end connected to the actuator. Given the simple profile, thin wall thickness, and long length needed, sheet metal rolling is a suitable manufacturing process for the cam channel. Galvanized steel is a suitable material for this application.

Linear guide carriages 610 are bolted to the base of the cam channels 604 and ride within the t-slots 1004 of the grow lines 202. In some implementations, one carriage 610 is used per 6-meter section of cam channel. Carriages 610 may be injection molded plastic for low friction and wear resistance. Bolts attach the carriages 610 to the cam channel

604 by threading into over molded threaded inserts. If select cams 602 are removed, these bolts are accessible so that a section of cam channel 604 can be detached from the carriage and removed.

Sections of cam channel 604 are joined together with pairs of connectors 616 at each joint; alternatively, detent clevis pins may be used. Connectors 616 may be galvanized steel bars with machined holes at 20 mm spacing (the same hole spacing as the cam channel 604). Shoulder bolts 618 pass through holes in the outer connector, through the cam channel 604, and thread into holes in the inner connector. If the shoulder bolts fall in the same position as a cam 602, they can be used in place of a binding post. The heads of the shoulder bolts 618 are accessible so that connectors and sections of cam channel can be removed.

Figure 7A:
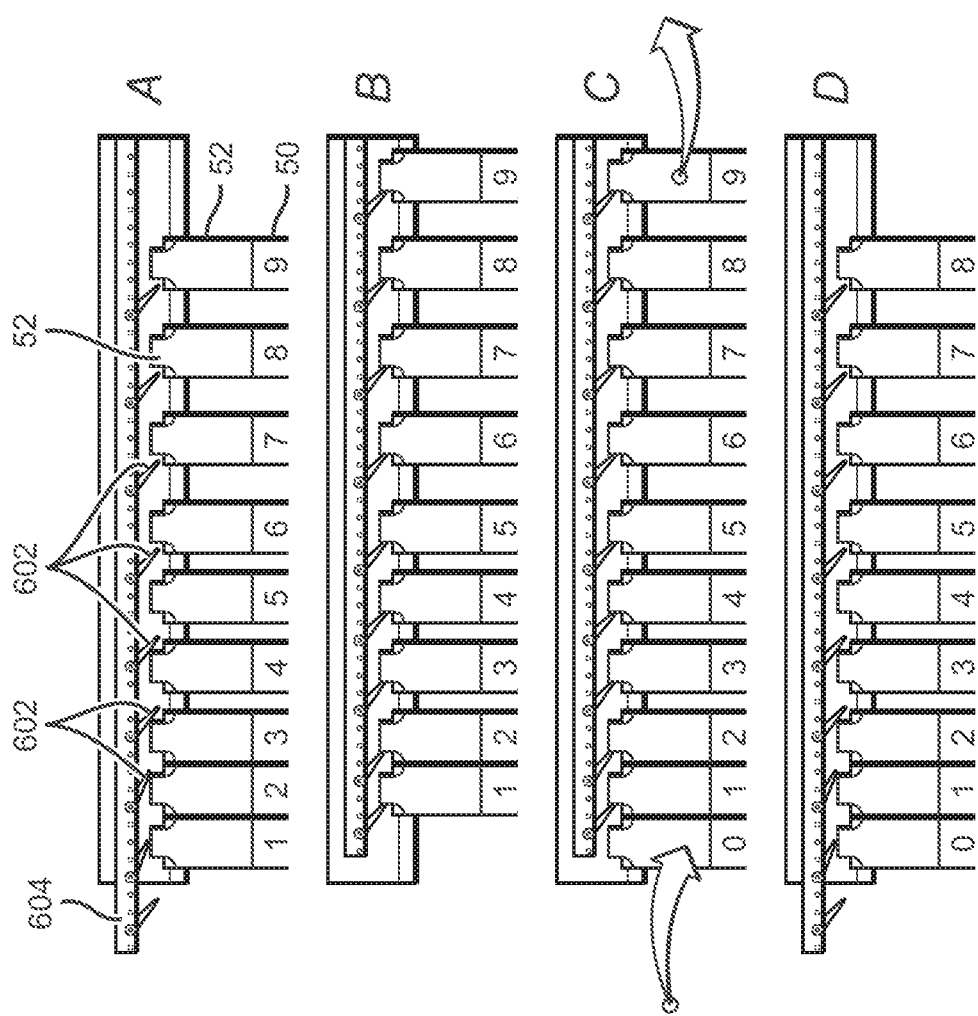
FIG. 7A is a sequence diagram illustrating operation of an example reciprocating cam mechanism.

In one implementation, cam channel 604 attaches to a linear actuator, which operates in a forward and a back stroke. A suitable linear actuator may be the T13-B4010MS053-62 actuator offered by Thomson, Inc. of Redford, Virginia; however, the reciprocating cam mechanism described herein can be operated with a variety of different actuators. The linear actuator may be attached to cam channel 604 at the off-loading end of a grow line 202, rather than the on-boarding end. In such a configuration, cam channel 604 is under tension when loaded by the towers 50 during a forward stroke of the actuator (which pulls the cam channel 604) which reduces risks of buckling. FIG. 7A illustrates operation of the reciprocating cam mechanism according to one implementation of the invention. In step A, the linear actuator has completed a full back stroke; as FIG. 7A illustrates, one or more cams 602 may ratchet over the hooks 52 of a grow tower 50. Step B of FIG. 7A illustrates the position of cam channel 604 and cams 602 at the end of a forward stroke. During the forward stroke, cams 602 engage corresponding grow towers 50 and move them in the forward direction along grow line 202 as shown. Step C of FIG. 7A illustrates how a new grow tower 50 (Tower 0) may be inserted onto a grow line 202 and how the last tower (Tower 9) may be removed. Step D illustrates how cams 602 ratchet over the grow towers 50 during a back stroke, in the same manner as Step A. The basic principle of this reciprocating cam mechanism is that reciprocating motion from a relatively short stroke of the actuator transports towers 50 in one direction along the entire length of the grow line 202. More specifically, on the forward stroke, all grow towers 50 on a grow line 202 are pushed forward one position. On the back stroke, the cams 602 ratchet over an adjacent tower one position back; the grow towers remain in the same location. As shown, when a grow line 202 is full, a new grow tower may be loaded and a last tower unloaded after each forward stroke of the linear actuator. In some implementations, the top portion of the hook 52 (the portion on which the cams push), is slightly narrower than the width of a grow tower 50. As a result, cams 602 can still engage with the hooks 52 when grow towers 50 are spaced immediately adjacent to each other. FIG. 7A shows 9 grow towers for didactic purposes. A grow line 202 can be configured to be quite long (for example, 40 meters) allowing for a much greater number of towers 50 on a grow line 202 (such as 400-450). Other implementations are possible. For example, the minimum tower spacing can be set equal to or slightly greater than two times the side-to-side distance of a grow tower 50 to allow more than one grow tower 50 to be loaded onto a grow line 202 in each cycle.

Still further, as shown in FIG. 7A, the spacing of cams 602 along the cam channel 604 can be arranged to effect one-dimensional plant indexing along the grow line 202. In other words, the cams 602 of the reciprocating cam mechanism can be configured such that spacing between towers 50 increases as they travel along a grow line 202. For example, spacing between cams 602 may gradually increase from a minimum spacing at the beginning of a grow line to a maximum spacing at the end of the grow line 202. This may be useful for spacing plants apart as they grow to increase light interception and provide spacing, and, through variable spacing or indexing, increasing efficient usage of the growth chamber 20 and associated components, such as lighting. In one implementation, the forward and back stroke distance of the linear actuator is equal to (or slightly greater than) the maximum tower spacing. During the back stroke of the linear actuator, cams 602 at the beginning of a grow line 202 may ratchet and overshoot a grow tower 50. On the forward stroke, such cams 602 may travel respective distances before engaging a tower, whereas cams located further along the grow line 202 may travel shorter distances before engaging a tower or engage substantially immediately. In such an arrangement, the maximum tower spacing cannot be two times greater than the minimum tower spacing; otherwise, a cam 602 may ratchet over and engaging two or more grow towers 50. If greater maximum tower spacing is desired, an expansion joint may be used, as illustrated in FIG. 7B. An expansion joint allows the leading section of the cam channel 604 to begin traveling before the trailing end of the cam channel 604, thereby achieving a long stroke. In particular, as FIG. 7B shows, expansion joint 710 may attach to sections 604a and 604b of cam channel 604. In the initial position (702), the expansion joint 710 is collapsed. At the beginning of a forward stroke (704), the leading section 604a of cam channel 604 moves forward (as the actuator pulls on cam channel 604), while the trailing section 604b remains stationary. Once the bolt bottoms out on the expansion joint 710 (706), the trailing section 604 of cam channel 604 begins to move forward as well. On the back stroke (708), the expansion joint 710 collapses to its initial position.

Other implementations for moving vertical grow towers 50 may be employed. For example, a lead screw mechanism may be employed. In such an implementation, the threads of the lead screw engage hooks 52 disposed on grow line 202 and move grow towers 50 as the shaft rotates. The pitch of the thread may be varied to achieve one-dimensional plant indexing. In another implementation, a belt conveyor include paddles along the belt may be employed to move grow towers 50 along a grow line 202. In such an implementation, a series of belt conveyors arranged along a grow line 202, where each belt conveyor includes a different spacing distance among the paddles to achieve one-dimensional plant indexing. In yet other implementations, a power-and-free conveyor may be employed to move grow towers 50 along a grow line 202.

Other configurations for grow line 202 are possible. For example, although the grow line 202 illustrated in the various figures is horizontal to the ground, the grow line 202 may be sloped at a slight angle, either downwardly or upwardly relative to the direction of tower travel. Still further, while the grow line 202 described above operates to convey grow towers in a single direction, the grow line 202 may be configured to include multiple sections, where each section is oriented in a different direction. For example, two sections may be perpendicular to each other. In other implementations, two sections may run parallel to each other, but have opposite directions of travel, to form a substantially u-shaped travel path. In such an implementation, a return mechanism can transfer grow towers from the end of the first path section to the onload end of the second path section of the grow line.

Irrigation & Aqueous Nutrient Supply System

Figure 13:
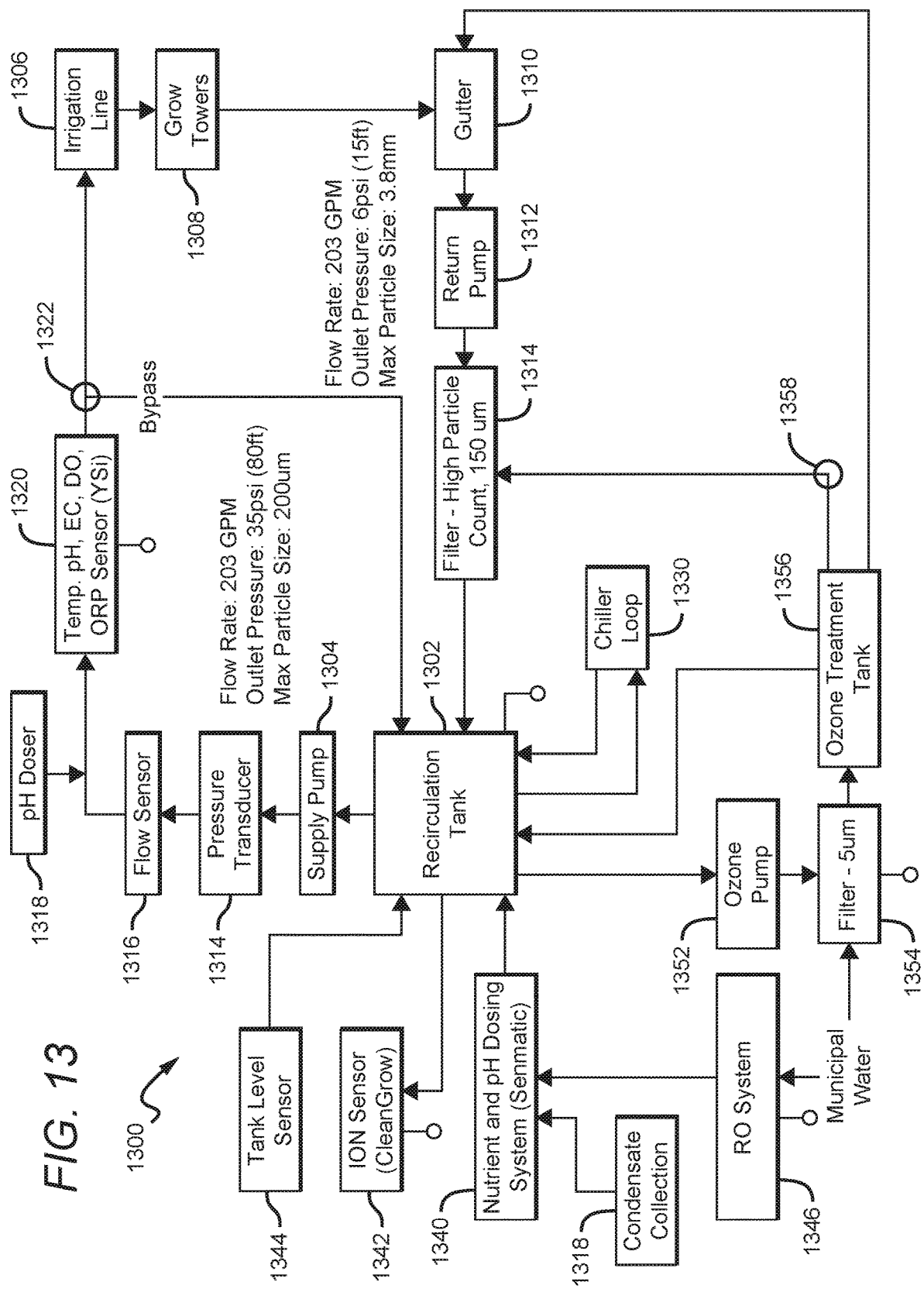
FIG. 13 is a functional block diagram illustrating an irrigation loop according to one possible implementation of the invention.

FIG. 13 is a functional block diagram setting forth the components of an irrigation system according to one implementation of the invention. In the implementation shown, the irrigation system 1300 is a closed-loop system comprising a recirculation tank 1302 that both supplies nutrient solution to grow towers 50 and receives excess or remaining nutrient solution returning from the grow towers 50. In the particular implementation shown, supply pump 1304 pumps aqueous nutrient solution from recirculation tank 1302 to one or more irrigation lines 1306 disposed above grow towers 1308. Gutter 1310 recovers excess aqueous nutrient solution that drops from grow towers 1308. A return pump 1312 returns excess aqueous nutrient solution to the screen filter, which then returns clean water to the recirculation tank 1302.

As FIG. 13 illustrates, irrigation system 1300 may include one or more components for conditioning or treating the aqueous nutrient solution, as well as sensing conditions at various points in the irrigation loop. For example, return filter 1314 may filter debris and other particulate matter prior to returning excess aqueous nutrient solution to the recirculation tank 1302. In one implementation, return filter may be a 150 micrometer, parabolic screen filter; however, other filters, such as media and disc filters, can be used depending on the particular application and expected particle size and quantity in excess aqueous nutrient solution. In some implementations, recirculation tank 1302 may include cooling cools. Chiller loop 1330 supplies cooling fluid through the coils to facilitate achieving a target temperature for the aqueous nutrient solution to be supplied to irrigation line 1306.

Crops in grow towers 50 will generally take up nutrients from aqueous nutrient solution, thereby lowering nutrient levels in the excess nutrient solution returning to recirculation tank 1302. Irrigation system 1300 may also include nutrient and pH dosing system 1340, ion sensor 1342 and tank level sensor 1344. During operation, ion sensor 1342 may sample the nutrient solution at a predefined interval. During sampling, ion sensor 1342 may check the ion levels of 8 separate nutrients and compare them to desired nutrient levels. Ion sensor 1342 may be an 8-ion analyzer offered by CleanGrow Sensors of Wolverhampton, United Kingdom. Responsive to detected nutrient levels, nutrient and pH dosing system 1350 may inject a single element type dose to be delivered to the recirculation tank 1302, based on the nutrient mix desired, and the room available in the tank (as sensed by tank level sensor 1344, for the water needed to transport the dose). In some implementations, nutrient and pH dosing system 1350 may use the sensed nutrient data and a desired nutrient recipe to calculate a nutrient adjustment mix to adjust the nutrient levels of recirculation tank 1302, using the smallest available volume in the tank. Nutrient and pH dosing system 1340 may include one or more venturi injectors for dosing particular nutrient solutions into the irrigation loop. In one implementation, nutrient and pH dosing system 1340 is an AMI Penta Fertilizer Mixer unit offered by Senmatic A/S of Sanderso, Denmark.

Irrigation system 1300 may also include pressure transducer 1314 and flow sensor 1316 to monitor irrigation loop conditions and control the operation of supply pump 1304. Irrigation system 1300 may also use water from condensate collection mechanism 1348, in one implementation as a primary source of water for the nutrient water. Condensate collection mechanism 1348 recaptures condensate in the air contained within growth environment 20 using, in one implementation, mechanical dehumidification. Reverse osmosis system 1346 filters water received from an external water source, such as a municipal water system, to the extent irrigation system 1300 requires additional water. In some implementations, reverse osmosis system 1346 may also filter water received from condensate collection mechanism 1346. Irrigation system 1300 may also include components for ozone treatment and cleaning of aqueous nutrient solution. For example, ozone pump 1352 supplies aqueous nutrient solution to ozone treatment tank 1356 filtered by filter 1354. Bypass valve 1358 can be used to redirect ozone injected water to treat the screen filter.

Irrigation system 1300 may also include in-line pH dosing system 1318 and 5-in-1 sensor 1320. 5-in-1 sensor samples temperature, pH, Electrical Conductivity (EC), dissolved oxygen and oxidization reduction potential of aqueous nutrient solution. In-line pH dosing system 1318 can make micro-adjustments to pH levels based on sensed pH in the irrigation loop. The cooling loop 1380 may be controlled based on the temperature that is read by 5-1 sensor 1320. Irrigation system 1300 may also include bypass valve 1322 to allow the irrigation supply, sensing components, and/or the filter to run without aqueous nutrient solution reaching irrigation line 1306. Bypass valve 1322 can be used to test irrigation system 1300 and/or use bypass valve 1322 to divert aqueous nutrient solution from irrigation line 1306 until desired pH and other conditions are met.

FIG. 8 illustrates how an irrigation line 802 may be attached to grow line 202 to supply an aqueous nutrient solution to crops disposed in grow towers 50 as they translate through the vertical tower conveyance system 200. Irrigation line 802, in one implementation, is a pressurized line with spaced-apart apertures disposed at the expected locations of the grow towers 50 as they advance along grow line 202 with each movement cycle. For example, the irrigation line 802 may be a polyvinyl chloride (PVC) pipe having an inner diameter of 0.75 inches and holes having diameters of 0.125 inches. The irrigation line 802 may be approximately 40 meters in length spanning the entire length of a grow line 202. To ensure adequate pressure across the entire line, irrigation line 802 may be broken into shorter sections, each connected to a manifold, so that pressure drop is reduced and to achieve consistent flow rate across a line. Nutrient water delivery to the sections can be controlled with solenoid or on/off valves to allow for water to be supplied to only some subset of the grow towers 50 in a grow line 202.

Figure 11A:
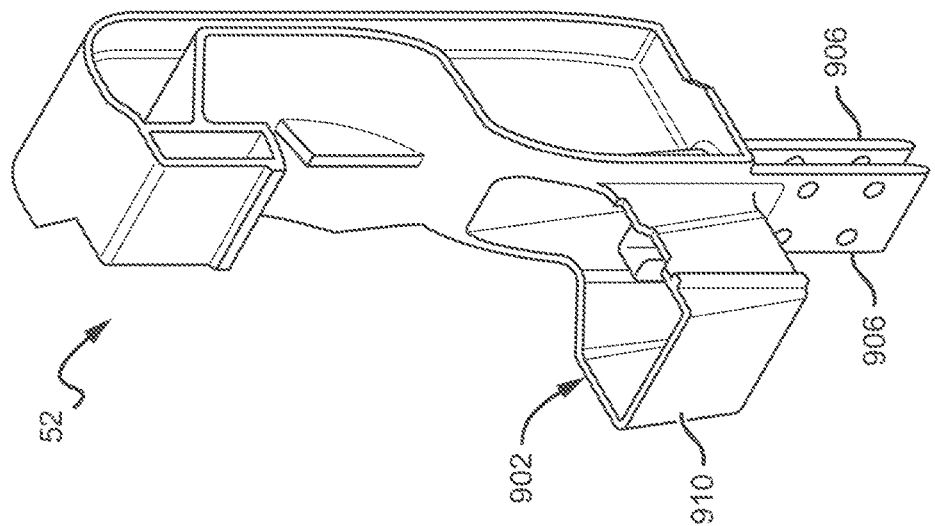
FIG. 11A is perspective view of an example tower hook and integrated funnel structure.

As FIG. 8 shows, a funnel structure 902 collects aqueous nutrient solution from irrigation line 802 and distributes the aqueous nutrient solution to the cavity(ies) 54a, 54b of the grow tower 50 as discussed in more detail below. FIGS. 9 and 11A illustrate that the funnel structure 902 may be integrated into hook 52. For example, the funnel structure 902 may include a collector 910, first and second passageways 912 and first and second slots 920. As FIG. 9 illustrates, the groove-engaging member 58 of the hook may disposed at a centerline of the overall hook structure. The funnel structure 902 may include flange sections 906 extending downwardly opposite the collector 910 and on opposing sides of the centerline. The outlets of the first and second passageways are oriented substantially adjacent to and at opposing sides of the flange sections 906, as shown. Flange sections 906 register with central wall 56 of grow tower 50 to center the hook 52 and provides additional sites to adhere or otherwise attach hook 52 to grow tower 50. In other words, when hook 52 is inserted into the top of grow tower 50, central wall 56 is disposed between flange sections 906. In the implementation shown, collector 910 extends laterally from the main body 53 of hook 52.

Figure 11B:
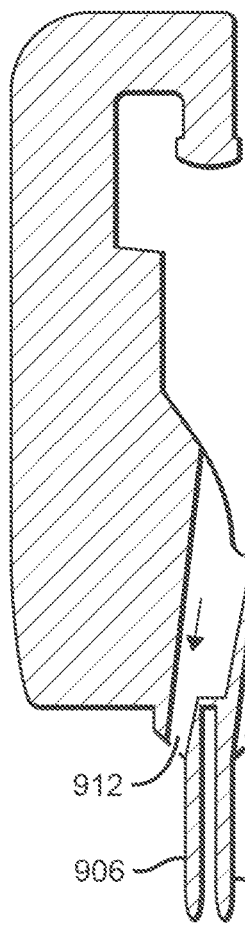
FIG. 11B is a section view of an example tower hook and integrated funnel structure.
Figure 11C:
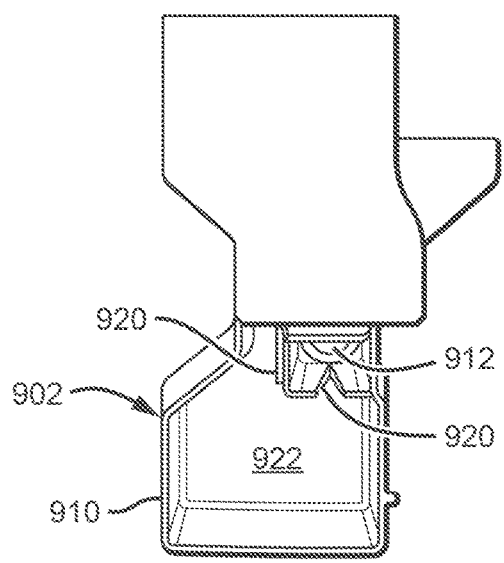
FIG. 11C is a top view of an example tower hook and integrated funnel structure.

As FIG. 11B shows, funnel structure 902 includes a collector 910 that collects nutrient fluid and distributes the fluid evenly to the inner cavities 54a and 54b of tower through passageways 912. Passageways 912 are configured to distribute aqueous nutrient solution near the central wall 56 and to the center back of each cavity 54a, 54b over the ends of the plug holders 158 and where the roots of a planted crop are expected. As FIG. 11C illustrates, in one implementation, the funnel structure 902 includes slots 920 that promote the even distribution of nutrient fluid to both passageways 912. For nutrient solution to reach passageways 912, it must flow through one of the slots 920. Each slot 920 may have a V-like configuration where the width of the slot opening increases as it extends from the substantially flat bottom surface 922 of collector 910. For example, each slot 920 may have a width of 1 millimeter at the bottom surface 922. The width of slot 920 may increase to 5 millimeters over a height of 25 millimeters. The configuration of the slots 920 causes nutrient fluid supplied at a sufficient flow rate by irrigation line 802 to accumulate in collector 910, as opposed to flowing directly to a particular passageway 912, and flow through slots 920 to promote even distribution of nutrient fluid to both passageways 912.

Other implementations are possible. For example, the funnel structure may be configured with two separate collectors that operate separately to distribute aqueous nutrient solution to a corresponding cavity 54a, 54b of a grow tower 50. In such a configuration, the irrigation supply line can be configured with one hole for each collector. In other implementations, the towers may only include a single cavity and include plug containers only on a single face 101 of the towers. Such a configuration still calls for a use of a funnel structure that directs aqueous nutrient solution to a desired middle and back portion of the tower cavity, but obviates the need for separate collectors or other structures facilitating even distribution.

In operation, irrigation line 802 provides aqueous nutrient solution to funnel structure 902 that evenly distributes the water to respective cavities 54a, 54b of grow tower 50. The aqueous nutrient solution supplied from the funnel structure 902 irrigates crops contained in respective plug containers 158 as it trickles down. In one implementation, a gutter disposed under each grow line 202 collects excess aqueous nutrient solution from the grow towers 50 for recycling. In one implementation, the width of the gutter can be configured to be larger than the width of the grow towers 50 but narrow enough to act as a guide to prevent grow towers 50 from swinging. For example, the width of the gutter can be 0.5 inches larger than the width of the grow towers 50, and the walls of the gutter can be configured to extend an inch or more higher than the bottom of grow towers 50.

The apertures of irrigation line 802 can simply be holes drilled (or otherwise machined) into the pipe structure. Water, however, has a propensity to wick onto the surface of the pipe as it exits the apertures causing water to run along the pipe and drip down outside the funnel structure of the grow towers. In some implementations, the apertures can include structures directed to reducing or controlling possible leakage caused by the foregoing. For example, the apertures may be drilled holes with slotted spring pins pressed in, drilled holes with coiled spring pins pressed in, and drilled holes with a custom machined feature around the circumference made from a custom mill tool. All three of the solutions above are intended to create a sharp lip at the exit of the hole such that water cannot run along the pipe. Still further, separate emitters can be used at the select positions along the grow line 202.

Figure 16A:
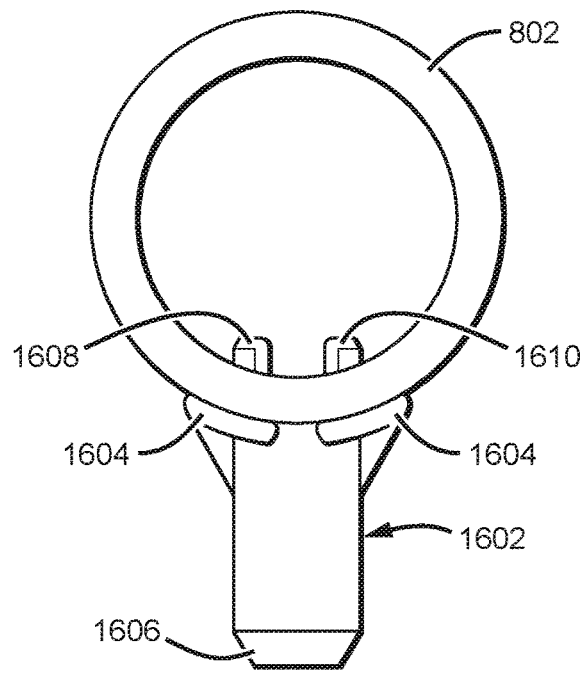
FIG. 16A is a sectional view of an irrigation line including a nozzle.
Figure 16B:
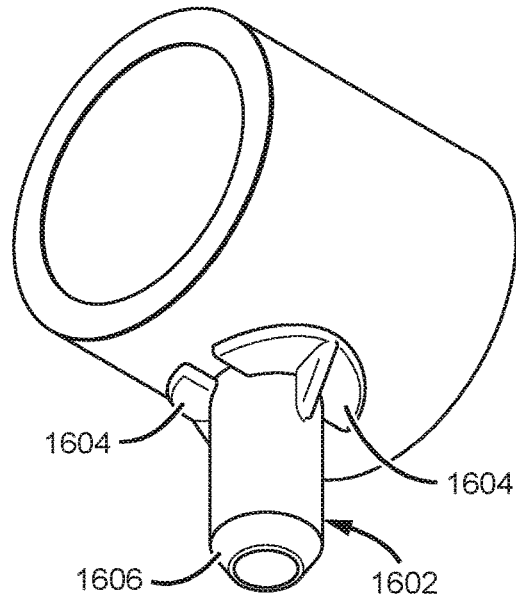
FIG. 16B is a perspective view of an irrigation line and nozzle.
Figure 16C:
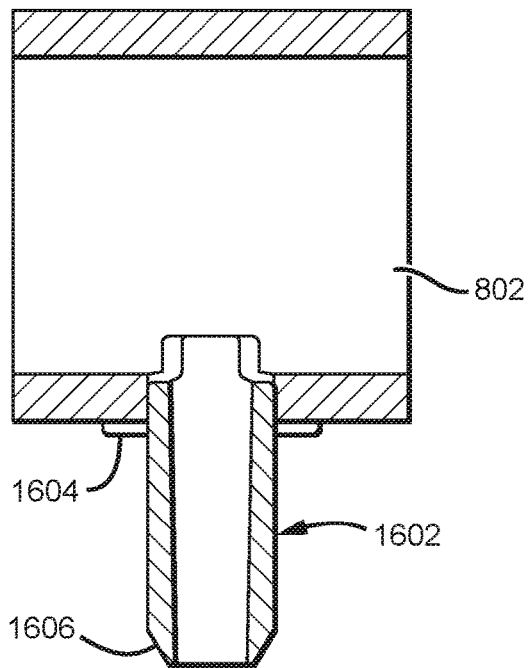
FIG. 16C is a sectional view of a nozzle disposed within an aperture of the irrigation line.
Figure 16D:
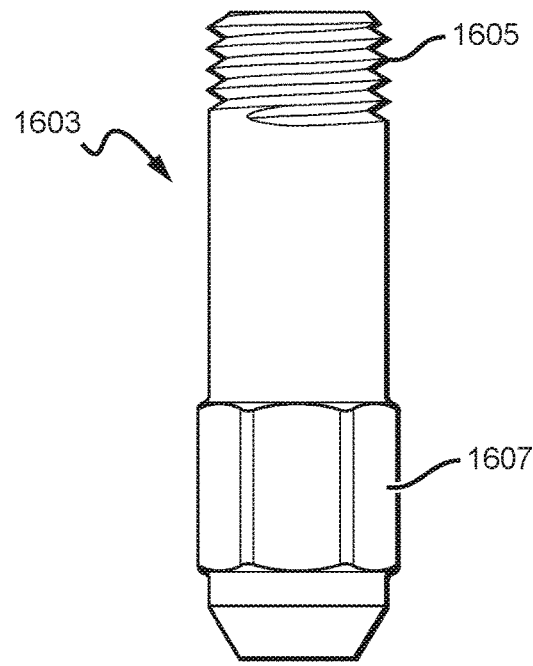
FIG. 16D is a side view of an alternative nozzle.

Other solutions are possible. For example, an injection molded part with a sharp lip may be configured to snap into the aperture or hole drilled into the irrigation line pipe. FIG. 16A is a section view of an irrigation line 802 including a nozzle 1602 attached to and extending from an aperture in irrigation line 802. FIG. 16B is a perspective view of nozzle 1602 attached to a section of irrigation line 802. FIG. 16C is a section view of nozzle 1602. As shown in FIGS. 16A and 16B, nozzle 1602 may include flanges 1604 to facilitate location and placement of nozzle 1602 in the apertures of irrigation line 802. In one implementation, nozzle 1602 may also include a small ridge or detent that engages the edge of the aperture at the inner surface of irrigation line 802 to allow nozzle 1602 to be snapped into place. Adhesives or ultrasonic welding can be used in addition to, or in lieu of, the small ridge to secure nozzle 1602. As the various figures show, nozzle 1602 includes a chamfered edge at the tip 1606 of nozzle 1602 to create a sharp transition to reduce water from wicking onto the outer surface of nozzle 1602. The upper portion 1608 of nozzle 1602 extending within irrigation line 802 may include a notch or slot 1610 to facilitate flow of nutrient solution out of irrigation line 802. Other implementations are possible. As shown in FIG. 16D for example, instead of pressing into a hole in the irrigation line 802, a nozzle 1603 may include threads 1605 which thread into a tapped hole of irrigation line 802. A seal may be formed between the threads of the nozzle and the line 802 and aided by a PTFE sealant (either thread tape or a paste). Such a nozzle 1603 may have a hexagonal portion 1607 extending along its body which allows it to be installed with a hexagonal drive tool.

Figure 17A:
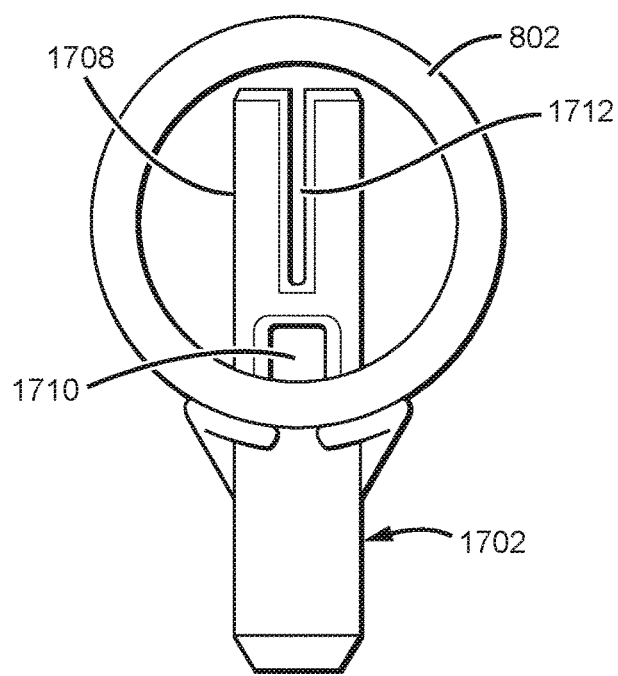
FIG. 17A is a sectional view of an irrigation line including a nozzle with an air-bleed element.
Figure 17B:
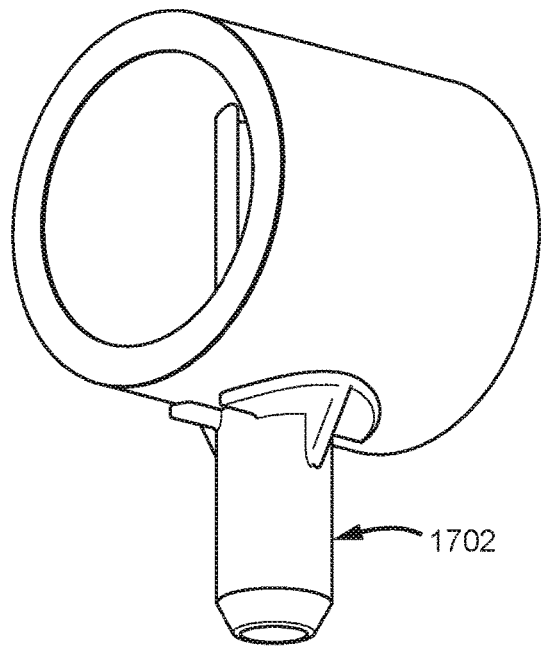
FIG. 17B is a perspective view of an irrigation line and nozzle with an air-bleed element.
Figure 17C:
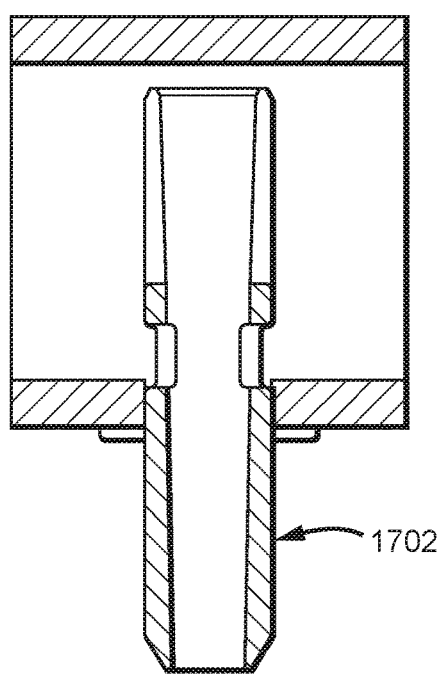
FIG. 17C is a sectional view of a nozzle with an air-bleed element disposed within an aperture of the irrigation line.

In one implementation, each aperture of irrigation line 802 may be fitted with nozzle 1602. In other implementations, the apertures at the second end (the end opposite the first end) of an irrigation line 802 (or the end of a section of irrigation line 802) may include an alternative nozzle 1702 including an air-bleed feature illustrated in FIGS. 17A, 17B and 17C. The air-bleed feature promotes consistent flow throughout irrigation line 802, as discussed in more detail below. In the implementation shown, the lower portion of nozzle 1702 is substantially the same as nozzle 1602. The upper portion 1708 of nozzle 1702 extends further into the interior of irrigation line 802 and includes slot 1810 and slit 1712. The extended upper portion 1708 facilitates bleeding air from irrigation line 802. Slit 1712 affords more room for water and air to facilitate their flow out of nozzle 1702.

Figure 18:
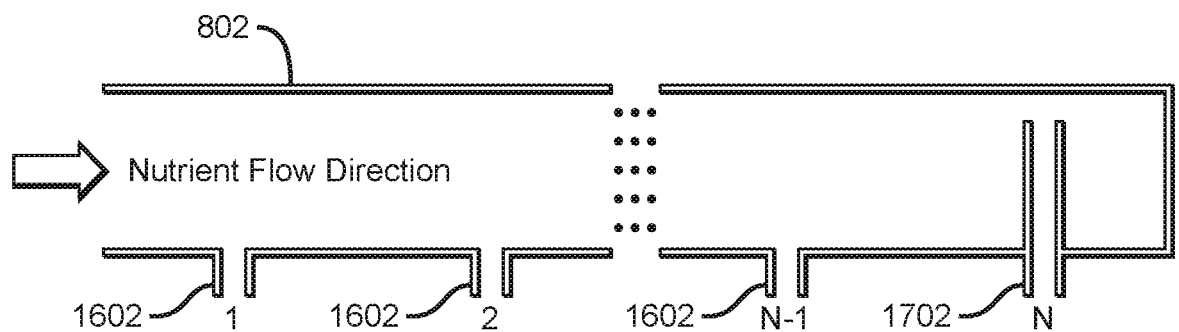
FIG. 18 is a schematic diagram of an irrigation line according to one implementation of the invention.

FIG. 18 is a schematic diagram illustrating an irrigation line for purposes of describing operation of the air-bleed feature described above. In various implementations, the irrigation system runs on a periodic basis in that the irrigation system is at rest between irrigation cycles. Between irrigation cycles, air fills the irrigation line 802 as the nutrient solution has drained off. At the beginning of an irrigation cycle (as the nutrient flow front moves into a section of irrigation line 802), air is pushed out of each nozzle 1602 until the nutrient solution passes a given nozzle. Once the front passes a given nozzle 1602, the nutrient solution starts to flow through the nozzle 1602 (instead of air). Nozzle N is the last nozzle to switch from air flow to nutrient flow. With this model for the nutrient flow when the irrigation cycle is started, the air flow though nozzle N should be the same if the upper portion of the last nozzle is short (i.e., matching nozzles (1602) 1, 2, . . . , N−1) or tall (to permit air venting) up to the time just before the nutrient front reaches nozzle N.

When the irrigation cycle begins and nutrient solution enters irrigation line 802, the solution pushes the air in the irrigation line 802 to the end of the line where it builds as one large pocket. With a nozzle having a shorter upper portion 1608, some of this air exits, but as the air is pushed out, water begins to cover the last (N) nozzle driving the air pocket above the water and above the last aperture. A new equilibrium is then obtained with water trickling out of the last aperture and a pocket of air sitting above the water. The air is then trapped and continues to exist in the line. Because the air takes up a volume, it prevents water from fully filling the irrigation line 802 thus creating flow out for the last aperture which is much less than at all other sites. Depending on the size of this air pocket, this weaker flow may exist for apertures (N−1, N−2, etc.) prior to the last (N) as well. The taller upper portion 1708 of nozzle 1702 allows for air to be constantly drained (i.e., small volumes of air at more frequent intervals). Because the top of the nozzle 1702 is at the top of inner surface of irrigation line 802 were the air pocket is located, air can always drain from this nozzle independently from the amount of water in the line. Unlike the shorter nozzle where a pocket of air may be trapped above the water in the line 802 and never able to exit (driving poor flow behavior), the longer nozzle 1702 allows air to more freely exit. In one implementation, the irrigation system supplies nutrient solution at a first end of the irrigation line 802. In such an implementation, nozzle 1702 is attached proximal to the second end of irrigation line 802 (or section of irrigation line 802). In other implementations, the irrigation system supplies nutrient solution to a middle portion of the irrigation line 802. In such an implementation, nozzle 1702 may be installed at both ends of irrigation line 802 (or sections thereof).

Figure 25A:
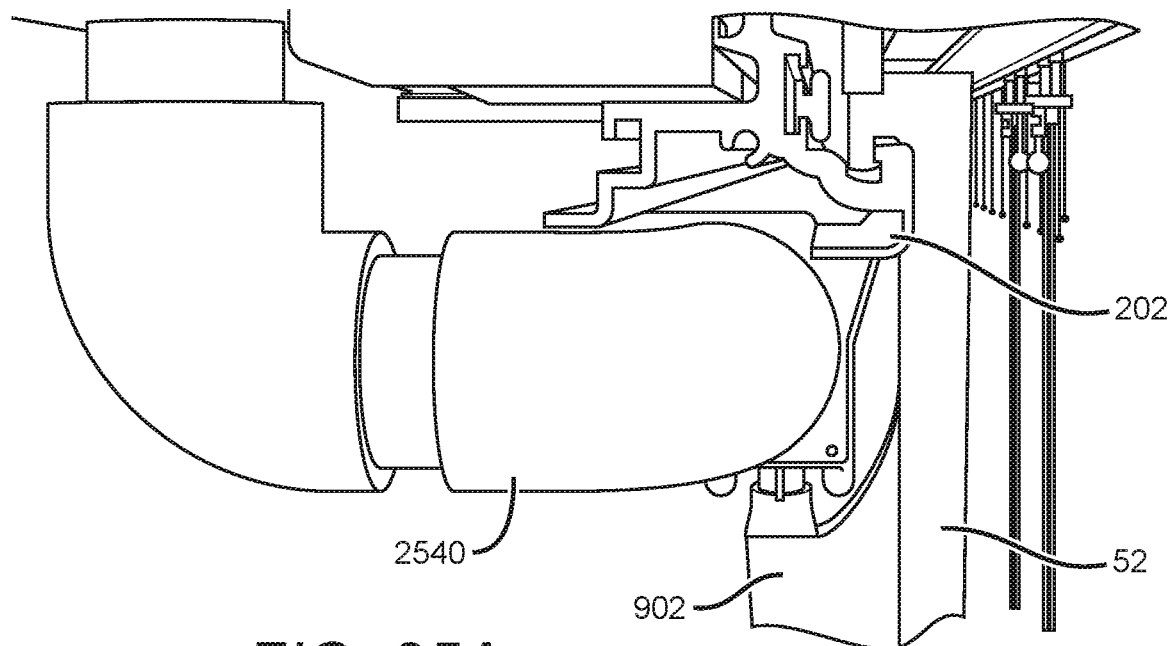
FIG. 25A is a perspective view of an irrigation line illustrating attachment of an in-let pipe.
Figure 25B:
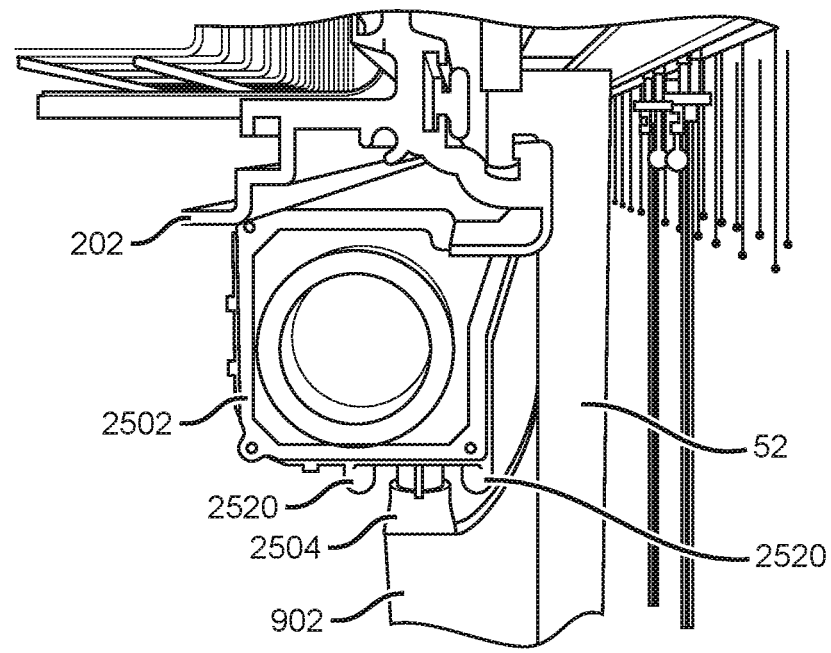
FIG. 25B is a perspective view of the irrigation line with the inlet pipe removed.
Figure 25C:
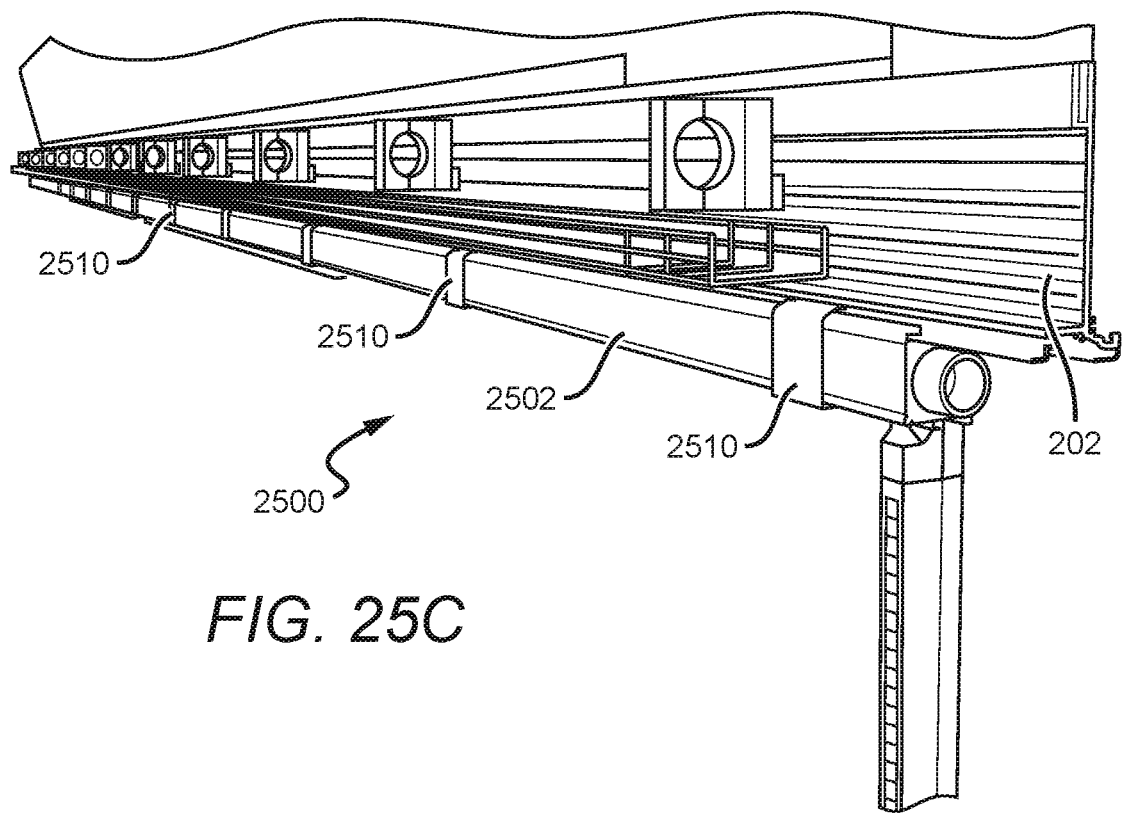
FIG. 25C is a perspective view illustrating a plenum extending along a grow line.

FIG. 25C is a perspective view of an alternative irrigation line for use in the farm production system described herein. The irrigation line 802 discussed above is a linear tube with a relatively narrow profile (compared to the plenum-based concept described below). The plenum-based concept may have certain advantages relative to the foregoing system in terms of operating and installation costs. In the implementation shown, the irrigation line 2500 comprises a plenum 2502 and a plurality of nozzles 2504 extending downwardly there from. FIG. 25A is a perspective view illustrating how plenum 2502 is connected to an aqueous nutrient supply system. In the implementation shown, plenum 2502 is fed from a first end, while the opposing end of the plenum 2502 is sealed. Alternatively, the opposing end may be coupled to a second plenum with a butterfly valve that allows for a cleaning solution to flush the first and second plenum.

Figure 25D:
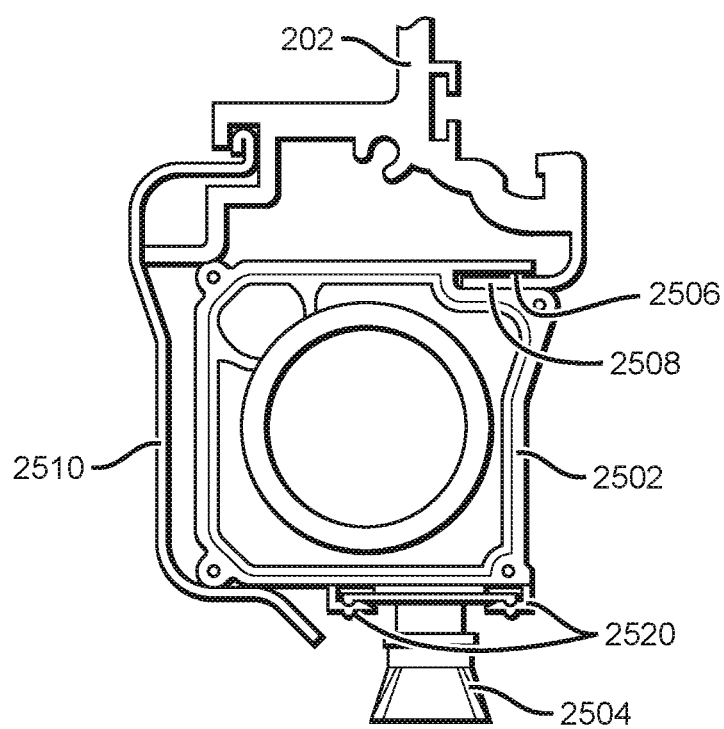
FIG. 25D is a side elevation view of the plenum attached to a grow line.

FIG. 25D illustrates how the plenum 2502 attaches to a grow line 202. In the implementation shown, plenum 2502 comprises a slot 2506 extending along the length thereof. Slot 2506 engages with ridge 2508 extending from the grow line 202 as shown. As FIG. 25C illustrates, brackets 2510 (or other fastening members) can be used to secure the plenum 2502 relative to the grow line 202.

Plenum 2502 may be a relatively long, such as 20 to 120 or more feet. In one implementation, plenum may be approximately 40 feet in length. In one implementation, a single plenum 2502 may configured to irrigate an entire grow line 202 or a selected section thereof. For example, if the grow line 202 is u-shaped, a first plenum may be installed on a first path section, and a second plenum may be installed on a second path section. In the implementation shown, the profile of plenum 2502 may be substantially square in overall configuration and approximately 100 millimeters by 100 millimeters. However, the profile shape and dimensions may vary based on a variety of design and engineering considerations. Irrigation line 2500 is a pressure-driven system. In the implementation shown, plenum 2502 is fed from a first end by inlet 2540. In other implementations, the plenum 2502 may be fed from a point between either end thereof.

FIGS. 25A and 25B also show how the funnel structure 902 of the hook 52 of a grow tower 50 are aligned with a nozzle 2504. As discussed above, the nozzles 2504 may be spaced along the plenum 2502 at positions that line up with the positions of the grow tower conveyance system 200. For example, the nozzles may be spaced at approximately 53 millimeters apart from each other. This spacing may gradually increase to a maximum spacing (e.g., 127 millimeters) along the length of the plenum as it extends from the starting to harvest (end) of the grow line 202.

Figure 26A:
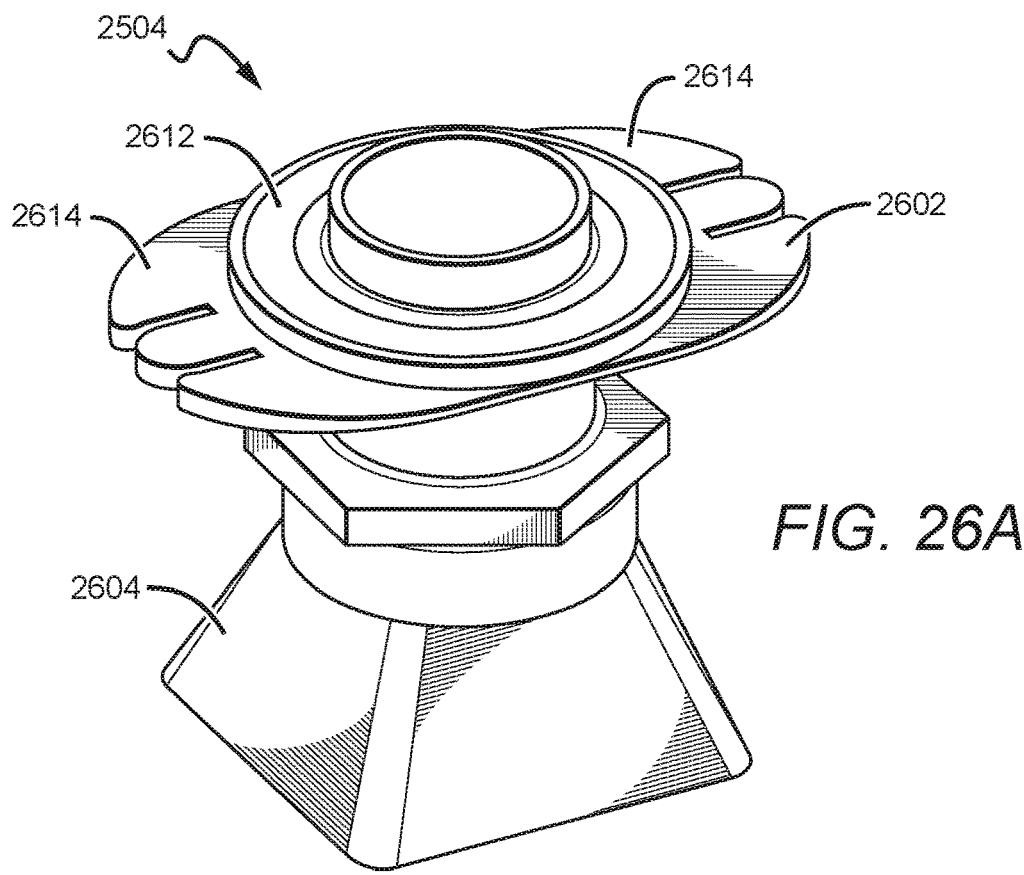
FIG. 26A is a perspective view of an example nozzle.
Figure 26B:
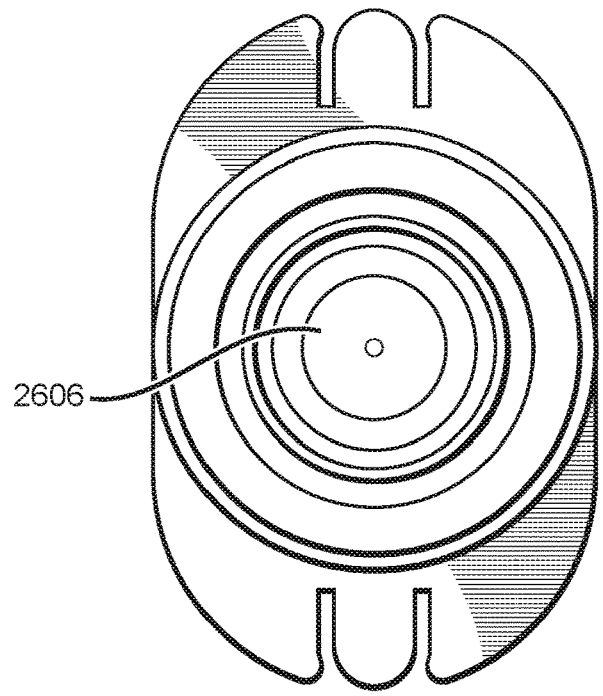
FIG. 26B is a bottom view of the example nozzle.

FIG. 26A is a perspective view of an example nozzle 2504 that is detached from plenum 2502. FIG. 26B is a bottom view of the nozzle 2504. Nozzle 2504 includes a connector portion 2602, a light skirt 2604, and a pressure-regulated flow controller 2606. Connector portion 2602 includes a connector tube section 2612 that engages a corresponding hole defined in plenum 2502. Connector portion further comprises O-ring 2612 and flange member 2614. Plenum 2502 includes engagement tracks 2520 on either sides of the holes defined therein for the nozzles 2504. To install a nozzle 2504, an assembler inserts nozzle 2504 such that tube section 2612 is engaged in a hold of plenum 2502 and flange member 2614 is oriented such that it fits between the opposing engagement tracks 2520. The assembler then rotates nozzle 2504 a quarter turn causing the flange member 2614 to be secured in the engagement tracks and O-ring to provide a water-tight seal between plenum 2502 and nozzle 2504.

Light skirt 2604 extends outwardly as shown such that the outer edge of the light skirt substantially conforms to profile of funnel structure 902 of hook 52. The target spacing between the edge of light skirt 2604 and the funnel structure 902 can be 1-2 millimeters. This configuration shields the nozzle and funnel structure from grow lights, reducing the likelihood of algae or other growth. In one implementation, light skirt 2604 can be made of a soft, flexible material that allows the skirt to deform to allow hook 52 to pass under nozzle 2504 during a tower conveyance cycle.

In one implementation, flow controller 2606 is an aerator that includes laminar stream straighteners to produce a non-aerated, non-splashing stream of solution. Flow controller 2606 may be an aerator sold under the Cache trademark by Neoperl GmbH of Muellheim, Germany. In one implementation, flow controller 2606 may include an upper, dome-shaped filter mesh, a pressure-regulated flow controller, and a lower filter mesh. Flow controller 2606 limits maximum flow rate after a threshold fluid pressure is reached. In other words, increasing pump pressure will not increase the flow rate through flow controller 2606 within normal engineering and design tolerances. For example, flow controller 2606 can be configured to limit the flow rate to a maximum flow rate after a threshold pressure of 15 pounds per square-inch (PSI) or more.

The use of pressure-regulated flow controllers 2606 at each nozzle 2504 creates back-pressure on the system, requiring the pump to deliver solution at at least a threshold pressure to achieve a target flow rate. For example, the pump may be configured to operate at 20 PSI. The operating pressure, however, may vary depending on the pressure rating of the flow controllers 2606 and other engineering and design considerations. At these operating pressures, plenum 2502 fills relatively quickly. Typical operating cycles for the irrigation system including irrigation cycle times ranging from several hours to 23 hours. In one implementation, towers are moved by the conveyance mechanism during breaks in the irrigation cycle. Excess air can escape through the nozzles 2504. Experiments indicate that any residual air trapped in the plenum 2502 is minimal and does not affect operation of the irrigation system or flow through any of the nozzles 2504. In one implementation, an air bleed valve located at the end of the plenum 2504 that opposes the inlet can be used to bleed excess air.

FIG. 14A illustrates an example gutter 1402 that can be disposed under a grow line 202 to collect excess aqueous nutrient solution from grow towers 50 attached to the grow line 202. In the implementation shown, gutter 1402 has a gradually-sloped (e.g., a 0.5% slope) bottom that causes excess nutrient solution to collect at end basin structure 1404. FIGS. 14B and 14C show end structure 1404 in more detail. As FIGS. 14B and 14C illustrate, basin structure 1404 couples to the low end of gutter 1402 and includes an outlet 1406 to which a pipe, barb, or other structure attaches. As FIG. 13 illustrates, return pump 1312 operably connects with a hose, or pipe, to end structure 1404 to pump excess aqueous nutrient solution back to recirculation tank 1302, as discussed above. The return pump 1312 may be controlled by utilizing an ultrasonic sensor to maintain a certain water level in the gutter as well as a pump outlet pressure in order for the nutrient solution to return to the filter on the skid.

Gutter 1402 may consist of multiple separate sections that are joined together to form a unitary structure. FIGS. 14D and 14E illustrate an example gutter section 1408 according to one implementation of the invention. Gutter section 1408 may comprise a main body 1410 and flanges 1412. As FIG. 14E illustrates, the bottom 1414 of gutter section is sloped. As FIG. 14A shows, multiple gutter sections are joined at respective flanges 1412 to create gutter 1402. In one implementation, gaskets between flanges of adjoining gutter sections can be used to achieve a watertight seal. Flanges 1412 may also include feet sections to facilitate securing the gutter to a floor or other structure. As FIG. 14A further illustrates, gutter sections are similar to each other, but not identical. For example, the initial height of bottom 1414 of a given gutter section 1408 substantially matches the ending height of the bottom of an adjoining gutter structure. Similarly, the ending height of bottom 1414 of the gutter structure 1408 substantially matches the initial height of the adjoining gutter section. In this manner, the overall structure achieves a substantially continuous slope causing excess aqueous nutrient solution to flow to end structure 1404 for recirculation or disposal. Other implementations are possible. For example, in other implementations, the gutter can be a sub-floor structure.

Figure 15A:
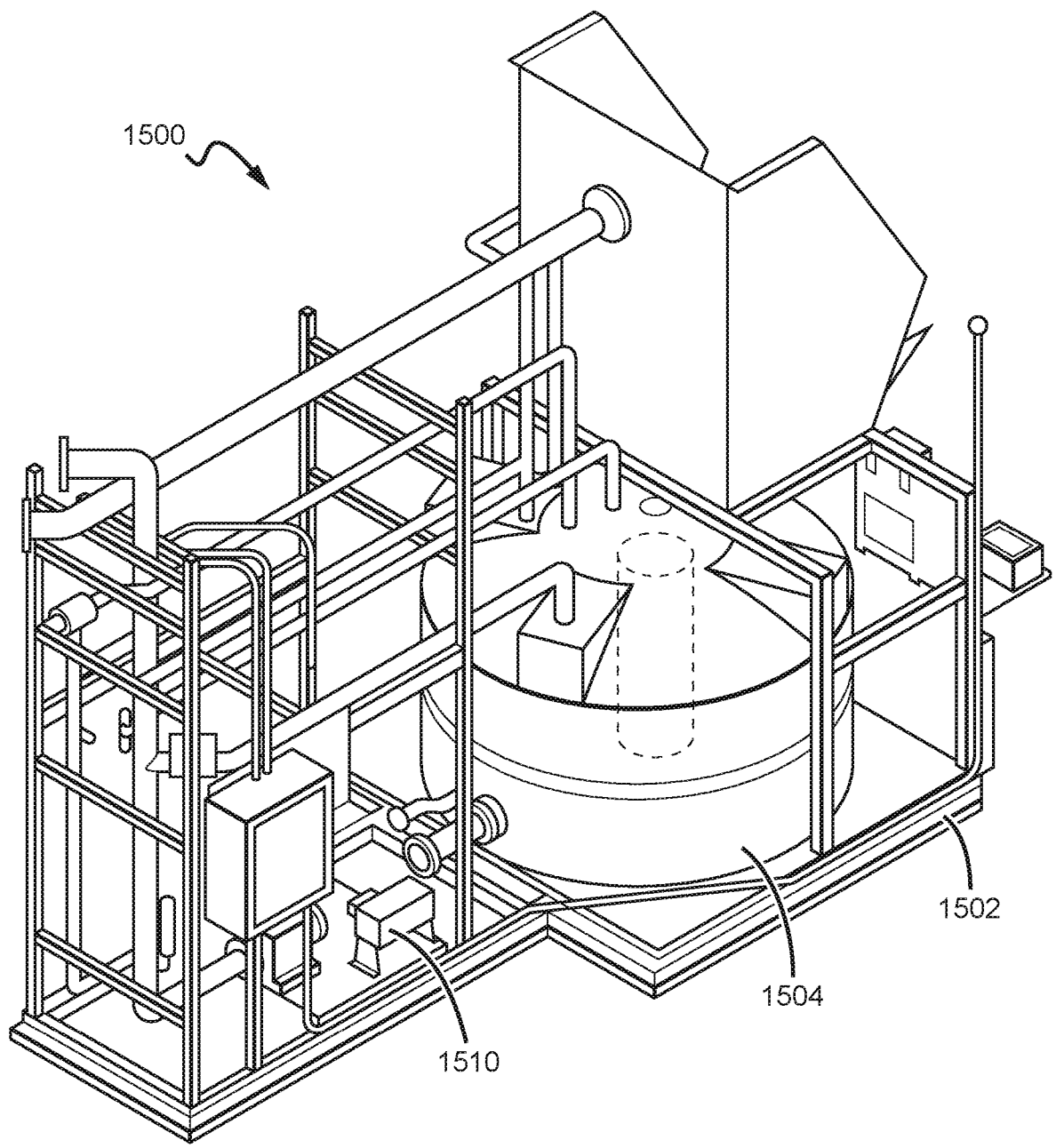
FIG. 15A is a perspective view of an example irrigation skid.
Figure 15B:
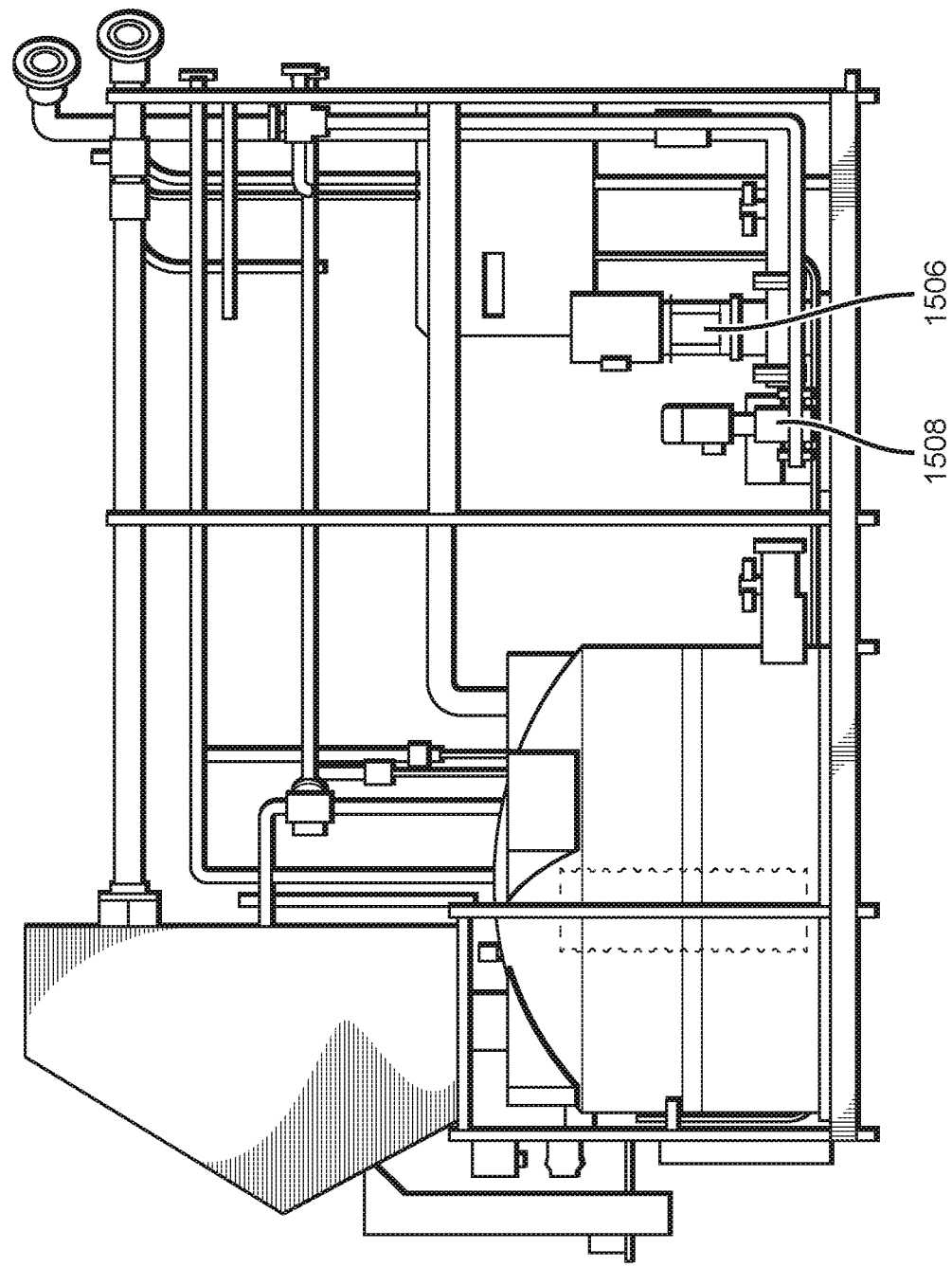
FIG. 15B is a side elevation view of the irrigation skid.

In one implementation, each grow line 202 is supported by a separate irrigation loop or zone that operates independently of irrigation loops associated with other grow lines in growth environment 20. In one implementation, each irrigation loop is supported by an irrigation skid that includes many of the components set forth in FIG. 13. Use of an irrigation skid allows for partial fabrication of the irrigation loop off site to lower overall costs of creating the crop production system. FIGS. 15A and 15B illustrate an irrigation skid 1500 according to one implementation of the invention. As FIGS. 15A and 15B illustrate, irrigation skid 1500 includes a frame 1502 onto which various irrigation components are mounted, such as recirculation tank 1504. In one implementation, irrigation skid 1500 also includes supply pump 1506, ozone supply pump 1508, and in-line pH dosing pump 1510. Irrigation skid 1500 also includes plumbing, valves, sensors, a filter, cooling coil, electrical and control components to connect and operate the irrigation loop. In one implementation, other components illustrated in FIG. 13 may operate or support multiple irrigation skids. For example, while irrigation skid 1500 includes ozone supply pump 1508 and associated plumbing, the remaining ozone cleaning components are separate from the skid and can be used to support multiple irrigation skids.

Nutrient and pH dosing system 1340, in one implementation, is operably connected to multiple irrigation skids 1500 by associated plumbing, valves and other controls. An irrigation control system controls valves and associated plumbing components as needed to interface nutrient and pH dosing system 1340, and associated sensors, with a given irrigation skid 1500. The Nutrient and pH dosing system has the ability to purge and rinse between dosing intervals, in order to prevent mixing of nutrient water from one recirculating loop to another. During operation, the nutrient solution in each recirculating irrigation loop is sampled on a predefined interval for that specific loop. During sampling, the ion levels of 8 separate nutrients may be checked and compared to the desired nutrient levels for that specific loop. Nutrient and pH dosing system 1340 may inject a nutrient dose to be delivered to the recirculation tank 1502 for that loop, based on the nutrient mix required and the room available in the tank for the water needed to transport the dose.

Figure 24A:
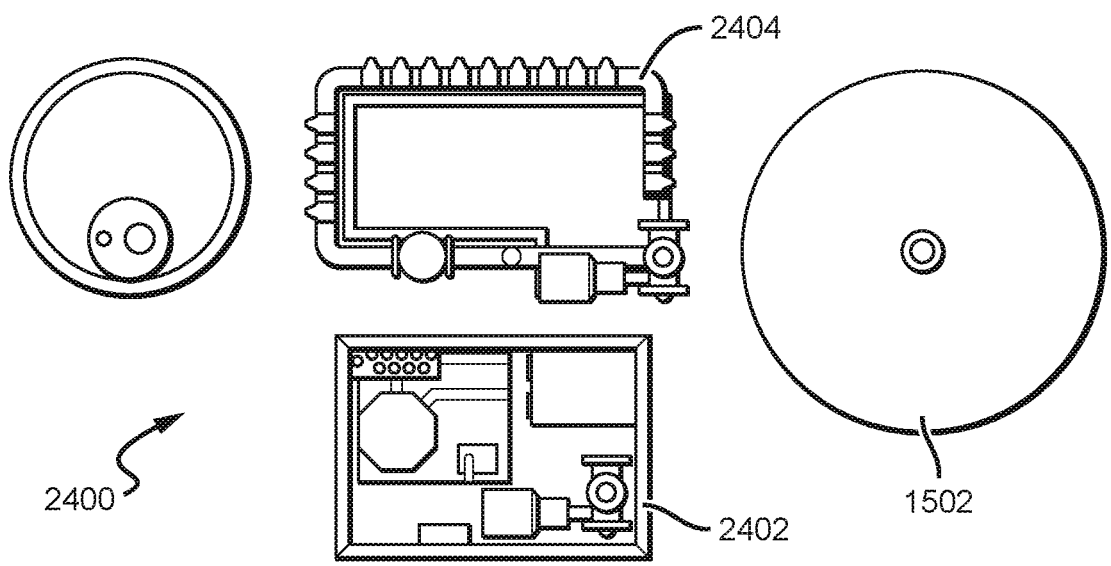
FIG. 24A is a top view of an alternative irrigation skid system.
Figure 24B:
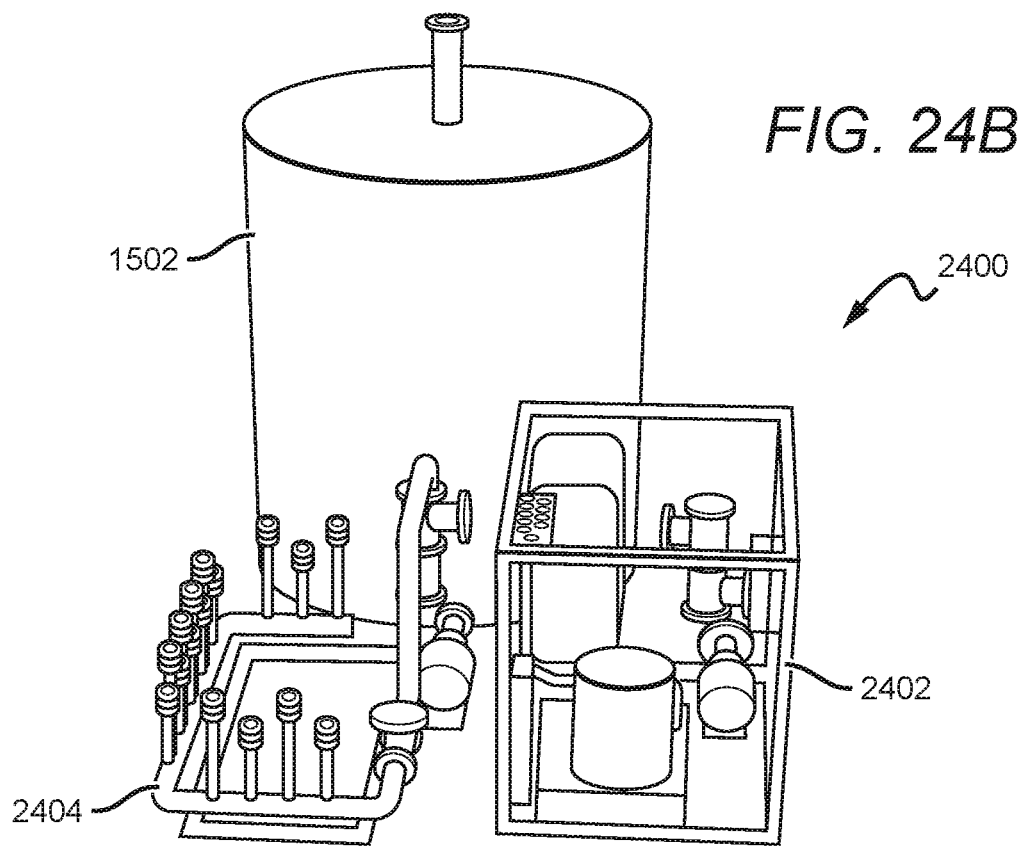
FIG. 24B is a perspective view of the alternative irrigation skid system.

FIGS. 24A and 24B illustrate an alternative irrigation skid system. In the implementation shown, the irrigation skid is divided into separate component skids 2402 and 2404, and a separate recirculation tank 1502. Component skid 2404 include the manifolds, pumps, filtration and control systems for pumping solution from a gutter to the recirculation tank 1502, and for pumping the solution from the recirculation tank 1502 to an irrigation line 802 (or 2500). Component skid 2402 includes the components associated with nutrient and pH dosing system 1340. As with irrigation skid 1500, component skids 2402, 2404 allow for partial fabrication of the irrigation loop off site to lower overall costs of creating the crop production system.

Grow Line Cover

In some embodiments, grow tower conveyance line (including, e.g., grow line 202, irrigation line 802) may include one or more grow line covers. In some embodiments, a grow line cover may shield one or more components of or attached to grow tower conveyance line from light originating from light emitting sources in the growth environment. For example, a grow line cover may shield a nozzle (attached to an irrigation line) from light originating from light emitting sources in the grow environment. In some instances, light incident on nozzle contributes to algae growth on the nozzle; a grow line cover reduces the intensity of the light incident on the nozzle which, in turn, leads to a reduction of algae growth on the nozzle.

In some embodiments, a grow line cover may prevent mechanical interference between one or more components of or attached to grow tower conveyance line and one or more components of or attached to a grow tower mounted on the grow tower conveyance line. For example, in some instances, the canopy of a plant at a grow site of a grow tower grows such that the plant canopy wraps around the sides of the grow tower (e.g., as illustrated in FIG. 4A). In some such instances, portions of the canopy of the plant located nearest the grow tower conveyance line may disrupt the flow of aqueous nutrient solution from a nozzle attached to an irrigation line to a funnel structure coupled to a cavity of the grow tower. The disruption of the aqueous nutrient solution flow by the plant may be mitigated by preventing access to the nozzle by the canopy near the nozzle. This may be achieved by using a grow line cover to at least partially block access to the nozzle.

Figure 19:
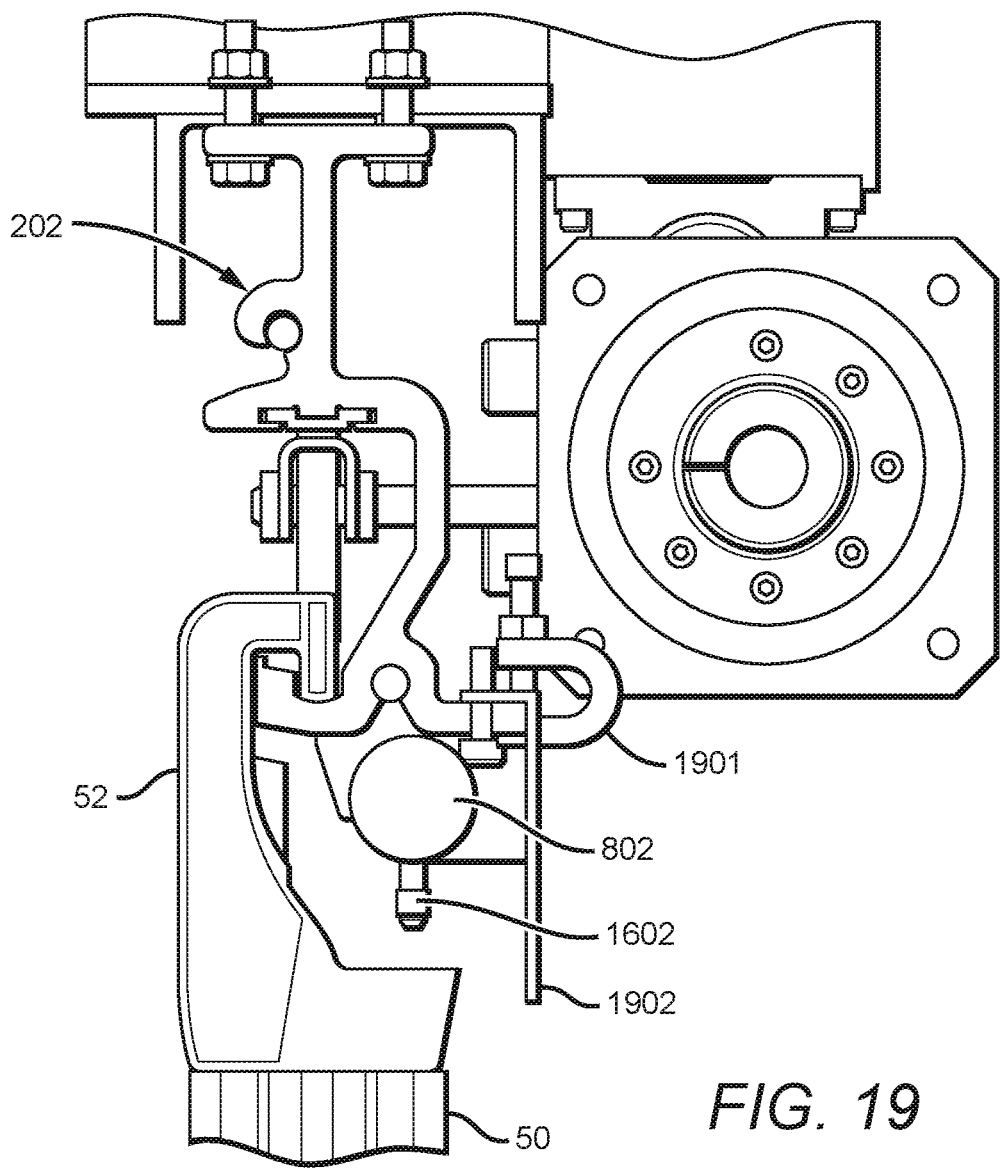
FIG. 19 is a profile view of an example grow line and a grow line cover.

FIG. 19 shows a profile view of an example grow line and a grow line cover. In an exemplary embodiment, a grow tower 50 is supported by a grow line 202 using a hook 52. In some embodiments, an irrigation line 802 with one or more nozzles (e.g., nozzle 1602) is attached to the grow line 202. In some embodiments, a grow line cover 1902 is attached to the grow line 202 using a grow line cover fastener 1901. In some embodiments, the grow line cover 1902 cross section is in the shape of an "L" as shown in FIG. 19. In some embodiments, the grow line fastener 1901 may have a cross section in the shape of a "C" as shown in FIG. 19. In some embodiments, the shape of the grow line cover may be optimized to more effectively block light or to more completely block access to the grow tower conveyance line (see grow line cover 1904 in FIG. 23 below).

Figure 20:
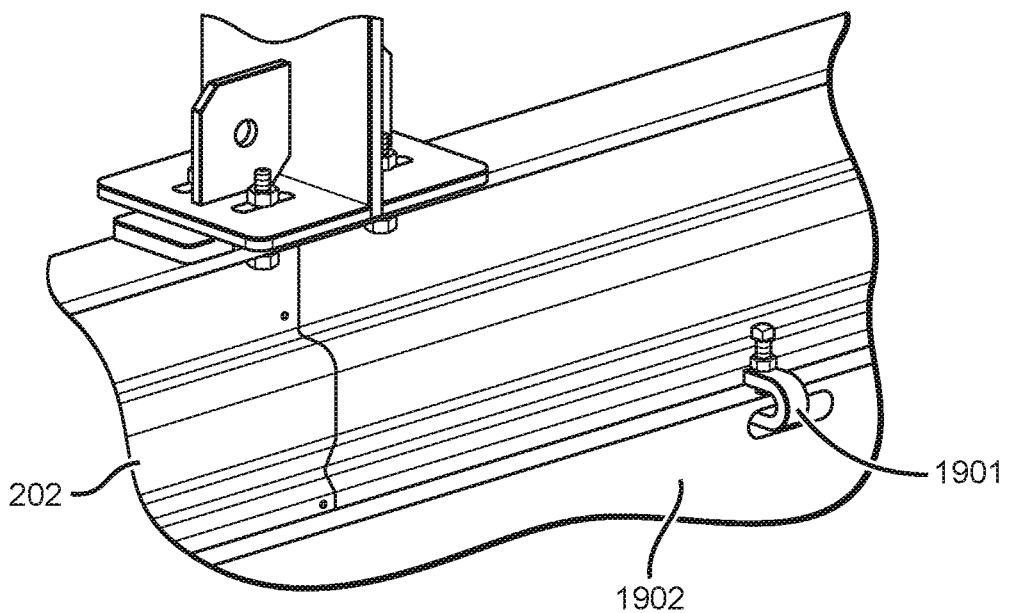
FIG. 20 is a perspective view of an example grow line and a grow line cover.

In some embodiments, the grow line cover 1902 may be a single piece (e.g., bent shape Aluminum sheet, extruded plastic cover) that is 3" to 8" tall (along the vertical direction in FIG. 19) and 8' to 10' in length (in the direction perpendicular to the view shown in FIG. 19). In some embodiments, the height of the grow line cover 1902 (along the vertical direction in FIG. 19) is selected based on the amount of light to be blocked. In some embodiments, the height of the grow line cover 1902 (along the vertical direction in FIG. 19) is selected based on how much of the access to the grow line should be allowed with the grow line cover 1902 in place. FIG. 20 shows a perspective view of an example grow line and a grow line cover. Grow line cover 1902 is attached to grow line 202 using a grow line cover fastener 1901.

Figure 21:
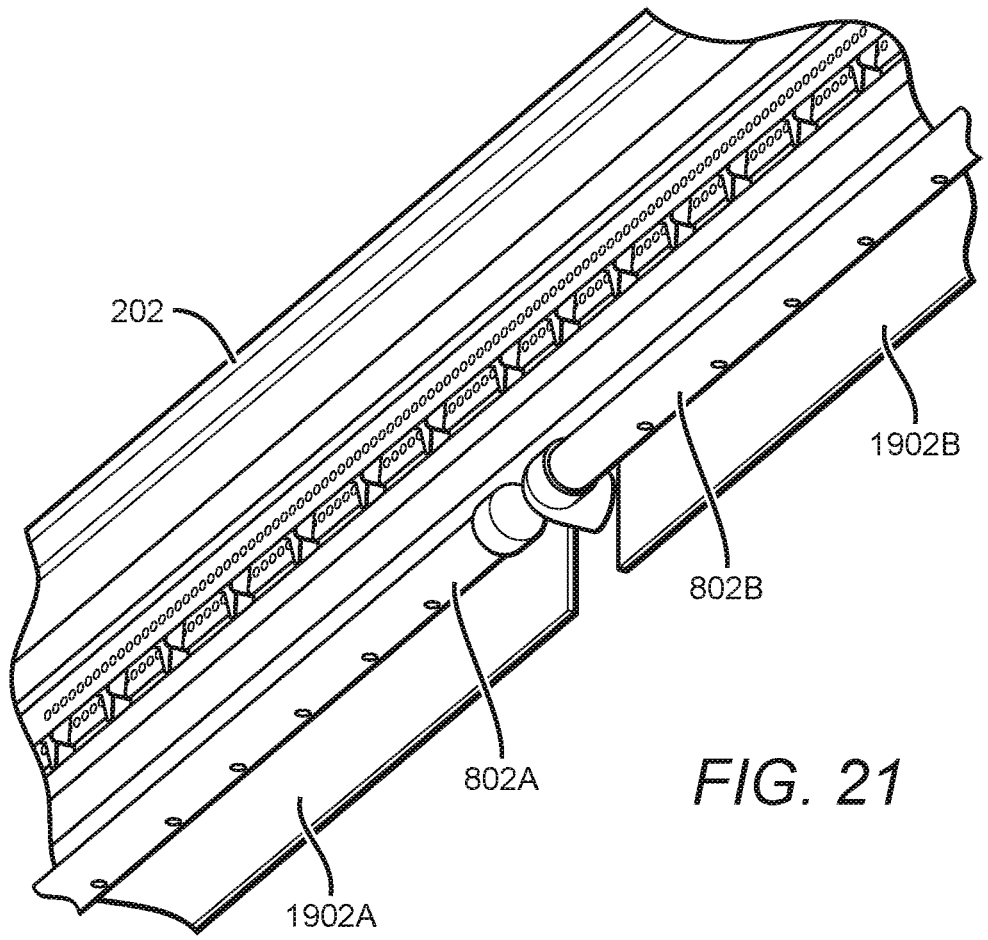
FIG. 21 is a perspective view of an example grow line and a grow line cover.
Figure 22:
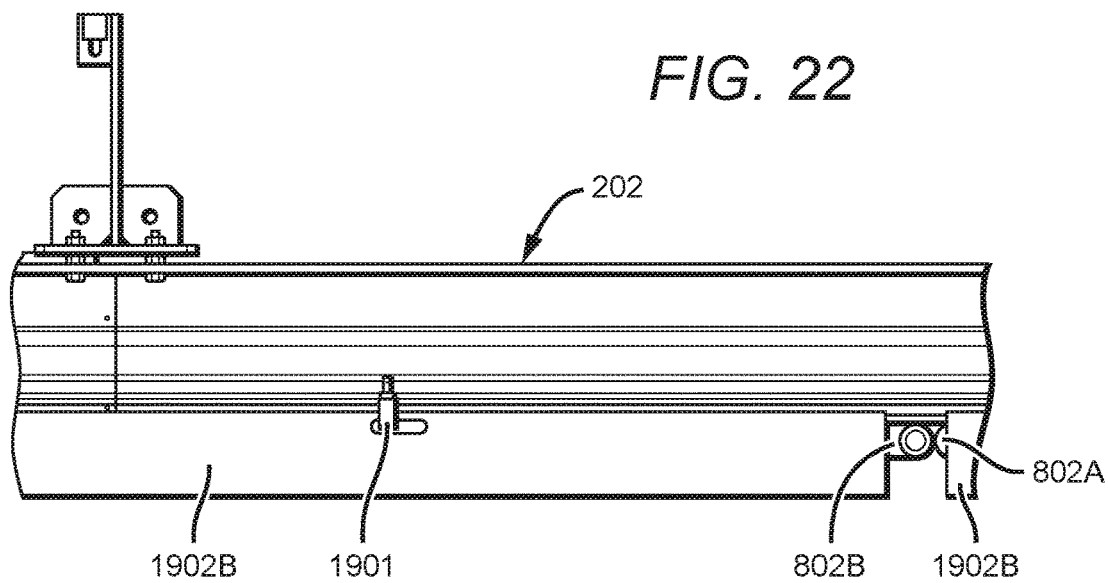
FIG. 22 is a side view of the example grow line and the grow line cover in FIG. 21.

FIG. 21 shows a perspective view of an example grow line and grow line covers. Grow line covers 1902A and 1902B are attached to grow line 202. Irrigation lines 802A and 802B are attached to grow line 202. FIG. 22 shows a side view of the example grow line and grow line covers shown in FIG. 21. Grow line cover 1902B is attached to grow line 202 using grow line fastener 1901. Grow line cover 1902A is attached to grow line 202. Irrigation lines 802A and 802B are attached to grow line 202. In some embodiments, a gap between adjacent grow line covers (as shown in FIGS. 21 and 22) or an opening in a grow line cover may be present. In some embodiments, the gap or opening may permit access to components of or attached to the grow line (e.g., gap between grow line covers 1902A and 1902B in FIGS. 21 and 22 for plumbing of irrigation line 802B). In some embodiments, the grow line cover may be a shorter section (e.g., <1' in length), and one or more grow line covers may be used to cover sections of the grow line (e.g., using a grow line cover at the site of nozzles with gaps between grow line covers away from the nozzle locations).

Figure 23:
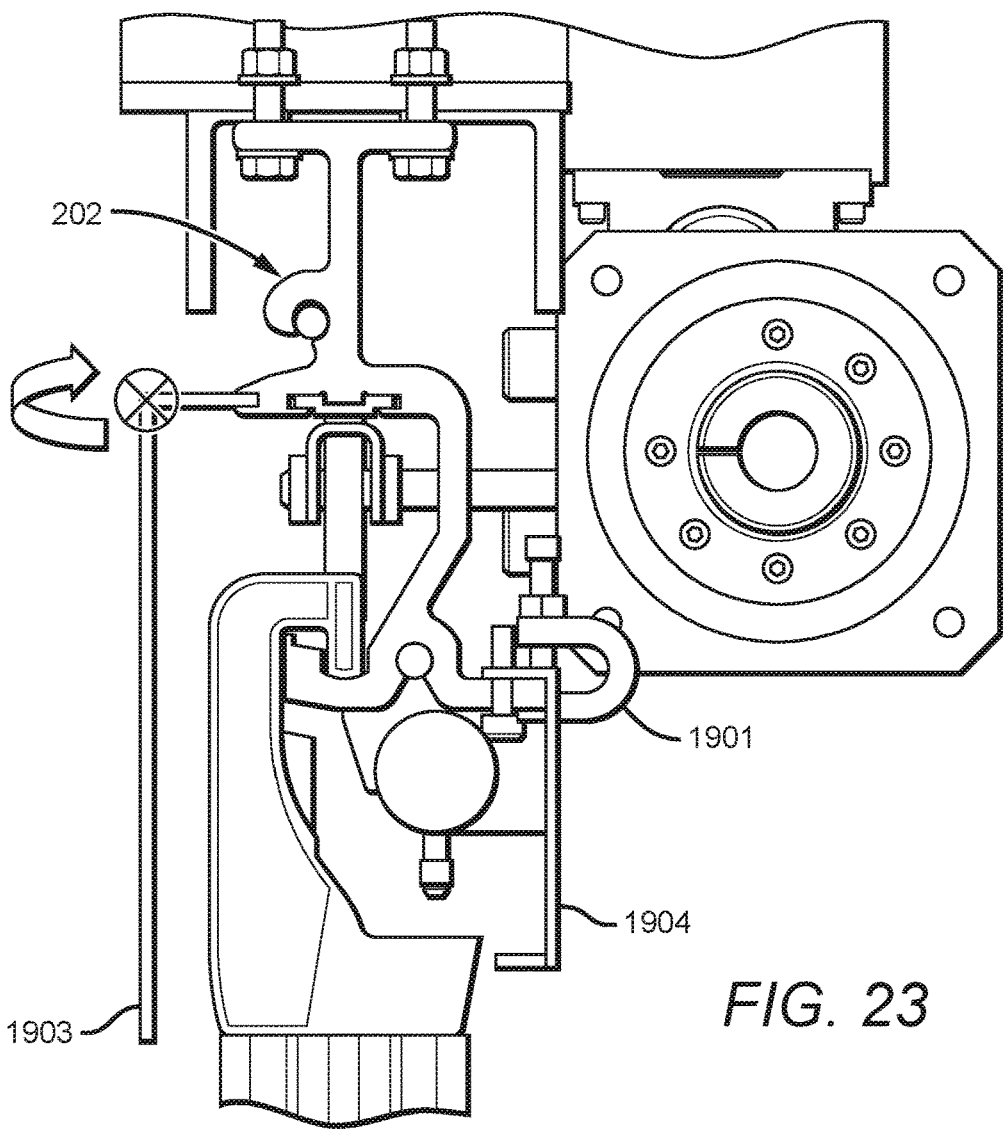
FIG. 23 is a profile view of an example grow line with two grow line covers.

In some embodiments, as shown in FIG. 23, a second grow line cover 1903 is attached to grow line 202. A fastener for attaching second grow line cover 1903 to grow line 202 is not shown. A first grow line cover 1904 is attached to grow line 202 using grow line fastener 1901. Compared to grow line cover 1902 in FIGS. 19-23, the shape of grow line cover 1904 has been modified to further reduce light from the grow environment from illuminating the nozzle. At the same time, the shape of grow line cover 1904 further restricts access to the grow tower conveyance line (e.g., for plant structures to disrupt flow from the nozzle to the funnel associated with the grow tower). In some embodiments, a grow line cover is designed to permit access to the covered area of the grow line without removing the grow line cover from the grow line. For example, in some embodiments, grow line cover 1903 is hinged at the location marked by the "X" in the circle. The hinge permits the rotation of the vertical portion of grow line cover 1903 in the diction indicated by the curved arrow. In some embodiments, the grow line cover may be detached from the grow line to permit access to the covered portion of the grow line (e.g., for servicing components of the grow line).

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

All references, articles, publications, patents, patent publications, and patent applications cited herein are incorporated by reference in their entireties for all purposes to the extent they are not inconsistent with embodiments of the disclosure expressly described herein. However, mention of any reference, article, publication, patent, patent publication, and patent application cited herein is not, and should not be taken as an acknowledgment or any form of suggestion that they constitute valid prior art or form part of the common general knowledge in any country in the world, or that they are disclose essential matter.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A crop production system for a vertical grow tower crop production, comprising:
   a grow line;
   one or more light emitting sources;
   a plurality of grow towers, each of the plurality of grow towers vertically attached to, and moveable along, the grow line, wherein each of the plurality of grow towers comprises a tower body and a funnel disposed on the top of the tower body, the funnel directing fluid flowing therethrough over a desired region within the tower body, each funnel having a profile;
   a grow tower conveyance mechanism operative to move the plurality of grow towers to select positions along the grow line;
   an irrigation system operative to supply a fluid to respective tops ends of the plurality of grow towers at one or more of the select positions along the grow line, wherein the irrigation system comprises a plurality of nozzles at the select positions and wherein each nozzle of the plurality of nozzles comprises a light skirt configured to shield the nozzle and funnel from at least of a portion of light emitted by the one or more light emitting sources, each light skirt having an outer edge that substantially conforms to the profile of the funnel of a respective grow tower at a target spacing, and such that there is no contact, between the outer edge and the profile of the funnel when a corresponding grow tower is at a select position of the select positions; and a gutter extending under and running parallel to the grow line, the gutter disposed beneath the plurality of grow towers to capture excess fluid supplied to the plurality of grow towers.

2. The crop production system of claim 1 wherein the irrigation system comprises a plenum extending along the grow line, wherein the plurality of nozzles are attached to the plenum at the select positions, wherein each of the nozzles comprises a pressure-regulating flow controller operative to limit the flow rate of the fluid supplied to a grow tower.

3. The crop production system of claim 2 wherein the irrigation system comprises a recirculation tank and a return pump operably connected to the gutter and that pumps fluid from the gutter to the recirculation tank.

4. The crop production system crop production system of claim 3 wherein the irrigation system comprises a supply pump operably connected to the recirculation tank and the plenum, the supply pump being operable to supply fluid from the recirculation tank to the plenum.

5. The crop production system of claim 1 wherein the target spacing is between 1 to 2 millimeters.

6. The crop production system of claim 1 wherein each of the grow towers includes a plurality of plug containers disposed along the tower body.

7. The crop production system of claim 6 wherein each of the plurality of grow towers comprises a first plurality of plug containers arranged along a first face of the grow tower.

8. The crop production system of claim 7 wherein each of the plurality of grow towers comprises a second plurality of plug containers arranged along a second face of the grow tower, wherein the second face is opposite to the first face, and wherein each of the plurality of grow towers includes a central wall defining a first cavity containing the first plurality of plug containers and a second cavity containing the second plurality of plug containers.

9. The crop production system of claim 8 wherein each funnel comprises a collector;

first and second passageways in fluid communication with the collector;

a first slot disposed in the collector and in the fluid communication path between the collector and the first passageway; and a second slot disposed in the collector trough and in the fluid communication path between the collector trough and the second passageway;

wherein the first and second slots are arranged to cause fluid to accumulate in the collector trough and distribute the fluid substantially evenly to the first and second passageways, the first passageway in fluid communication with the first cavity, and the second passageway in fluid communication with the second cavity.

10. The crop production system of claim 1 wherein the spacing of the select positions increase in a first direction such that spacing of the grow towers increases as such grow towers are moved along the grow line.

11. The crop production system of claim 1 wherein the conveyance mechanism comprises a reciprocating cam mechanism.

12. The crop production system of claim 1 wherein each of the plurality of grow towers comprises a hook attached to the top of the grow tower, wherein the hook is configured to engage the grow line.

13. The crop production system of claim 12 wherein each light skirt comprises a flexible material that allows the light skirt to deform when a hook of a corresponding grow tower is conveyed past the light skirt.

* * * * *